United States Patent
Iwai et al.

(10) Patent No.: US 12,225,589 B2
(45) Date of Patent: Feb. 11, 2025

(54) TRANSMISSION DEVICE, RECEPTION DEVICE, TRANSMISSION METHOD, AND RECEPTION METHOD USING RANDOM ACCESS PREAMBLE

(71) Applicant: Panasonic Intellectual Property Corporation of America, Torrance, CA (US)

(72) Inventors: Takashi Iwai, Ishikawa (JP); Tomofumi Takata, Ishikawa (JP); Hidetoshi Suzuki, Kanagawa (JP); Tetsuya Yamamoto, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 254 days.

(21) Appl. No.: 17/261,835

(22) PCT Filed: Oct. 2, 2019

(86) PCT No.: PCT/JP2019/038884
§ 371 (c)(1),
(2) Date: Jan. 20, 2021

(87) PCT Pub. No.: WO2020/090334
PCT Pub. Date: May 7, 2020

(65) Prior Publication Data
US 2021/0307075 A1    Sep. 30, 2021

(30) Foreign Application Priority Data

Nov. 1, 2018  (JP) ................................ 2018-206734

(51) Int. Cl.
*H04W 74/0833*    (2024.01)

(52) U.S. Cl.
CPC .............................. *H04W 74/0833* (2013.01)

(58) Field of Classification Search
CPC .. H04W 74/0833; H04L 5/003; H04L 5/0053; H04L 5/001; H04L 27/0006
See application file for complete search history.

(56) References Cited

U.S. PATENT DOCUMENTS 10,716,149 B2 *  7/2020  Ahn ................... H04W 74/0833
2013/0083753 A1 *  4/2013  Lee ....................... H04L 1/1858
                                                         370/329

(Continued)

FOREIGN PATENT DOCUMENTS

| CN | 112369108 A | 2/2021 |
| WO | WO-2018045247 A1 * | 3/2018 |
| WO | WO-2018085205 A1 * | 5/2018 |

OTHER PUBLICATIONS

Ericsson, "Feature lead summary for UL Signals and Channels," R1-1809726, Agenda Item: 7.2.2.3.2, 3GPP TSG RAN WG1 Meeting #94, Gothenburg, Sweden, Aug. 20-24, 2018, 10 pages.

(Continued)

*Primary Examiner* — Gary Mui
*Assistant Examiner* — Yewon Kim
(74) *Attorney, Agent, or Firm* — Seed IP Law Group LLP

(57) ABSTRACT

The present invention provides a terminal that can carry out a random-access process appropriately. A terminal (100) is provided with: a wireless transmission unit (108) that transmits a data signal; and a control unit (101) that determines a second resource for use in transmitting the data signal on the basis of a first resource for use in transmitting a preamble signal.

8 Claims, 21 Drawing Sheets

(56) References Cited

U.S. PATENT DOCUMENTS

| | | | |
|---|---|---|---|
| 2015/0016312 A1* | 1/2015 | Li | H04W 74/006 |
| | | | 370/280 |
| 2017/0332409 A1* | 11/2017 | Yerramalli | H04L 1/00 |
| 2018/0124626 A1 | 5/2018 | Tsai et al. | |
| 2019/0320467 A1* | 10/2019 | Freda | H04W 74/004 |
| 2019/0342874 A1* | 11/2019 | Davydov | H04W 72/23 |
| 2020/0100297 A1* | 3/2020 | Agiwal | H04B 17/318 |
| 2020/0112994 A1* | 4/2020 | Zhang | H04W 72/0446 |
| 2021/0274558 A1 | 9/2021 | Takata et al. | |

OTHER PUBLICATIONS

InterDigital Communications, "2-step random access procedure," R1-1700703, Agenda Item: 5.1.1.4.3, 3GPP TSG RAN WG1 AH_NR Meeting, Spokane, USA, Jan. 16-20, 2017, 5 pages.

International Search Report, mailed Dec. 24, 2019, for corresponding International Application No. PCT/JP2019/038884, 4 pages.

LG Electronics Inc., "Considerations on 2-Step CBRA procedure for NR-U SA," R2-1809940, Agenda Item: 11.2 (NR_newRAT-Core), 3GPP TSG-RAN WG2 #AH-1807, Montreal, Canada, Jul. 2-6, 2018, 3 pages.

Huawei, HiSilicon, "Random Access with Multiple Numerologies," R2-1702600, Agenda Item: 10.3.1.4, 3GPP TSG-RAN WG2 #97bis, Spokane, Washington DC, USA, Apr. 3-7, 2017, 3 pages.

Extended European Search Report, dated Dec. 2, 2021, for European Application No. 19877928.2-1215, 11 pages.

CATT, "Further considerations on a 2-step RA Procedure," R1-1700186, Agenda Item: 5.1.1.4.3, 3GPP TSG RAN WG1 AH_NR Meeting, Spokane, USA, Jan. 16-20, 2017, 4 pages.

English Translation of Chinese Search Report dated Jan. 8, 2024, for the corresponding Chinese Patent Application No. 2019800439861, 3 pages.

European Office Action dated Dec. 13, 2023, for the corresponding European Patent Application No. 19877928.2, 6 pages.

InterDigital, "Random access in NR-Unlicensed," R2-1811458, Agenda Item: 11.2.1.1, 3GPP TSG-RAN WG2 Meeting # 103, Gothenburg, Sweden, Aug. 20-24, 2018, 5 pages.

Examination Report, dated Sep. 23, 2024, for Indian Application No. 202348035845. (6 pages).

* cited by examiner

| Preamble part | | | Data part | |
|---|---|---|---|---|
| Preamble number | Cluster number | Interlace number | Cluster number | Interlace number |
| 0 | 0,1,···,9 | 0 | 0, 5 | same as preamble (=0) |
| 1 | | | 1, 6 | |
| 2 | | | 2, 7 | |
| 3 | | | 3, 8 | |
| 4 | | | 4, 9 | |

FIG. 8

| Preamble part | | | Data part | |
|---|---|---|---|---|
| Preamble number | Cluster number | Interlace number | Cluster number | Interlace number |
| 0 | 0,1,···,9 | 0 | 0, 1 | same as preamble (= 0) |
| 1 | | | 2, 3 | |
| 2 | | | 4, 5 | |
| 3 | | | 6, 7 | |
| 4 | | | 8, 9 | |

FIG. 10

| Preamble part | | Data part | | | |
|---|---|---|---|---|---|
| Preamble number | Cluster number | Interlace number | Cluster number for symbol#0 | Cluster number for symbol#1 | Cluster number for symbol#2 | Interlace number |
| 0 | 0,1,...,9 | 0 | 0, 5 | 2, 7 | 4, 9 | same as preamble (= 0) |
| 1 | | | 1, 6 | 3, 8 | 0, 5 | |
| 2 | | | 2, 7 | 4, 9 | 1, 6 | |
| 3 | | | 3, 8 | 0, 5 | 2, 7 | |
| 4 | | | 4, 9 | 1, 6 | 3, 8 | |

FIG. 11

| Preamble part | | | Data part | | |
|---|---|---|---|---|---|
| Preamble number | Cluster number | Interlace number | Cluster number | Interlace number | sub-PRB number |
| 0 | 0,1,⋯,9 | 0 | 0, 5 | same as preamble (= 0) | 0 |
| 1 | | | | | 1 |
| 2 | | | 1, 6 | | 0 |
| 3 | | | | | 1 |
| 4 | | | 2, 7 | | 0 |
| 5 | | | | | 1 |
| 6 | | | 3, 8 | | 0 |
| 7 | | | | | 1 |
| 8 | | | 4, 9 | | 0 |
| 9 | | | | | 1 |

FIG. 13

| Preamble part | | | Data part |
|---|---|---|---|
| Preamble number | Cluster number | Interlace number | Comb number |
| 0 | 0,1,···,9 | 0 | 0 |
| 1 | | | 1 |
| 2 | | | 2 |
| 3 | | | 3 |
| 4 | | | 4 |

FIG. 15

| Preamble number | Preamble part | | Data part | | |
| --- | --- | --- | --- | --- | --- |
| | Cluster number | Interlace number | Cluster number | Interlace number | symbol number |
| 0 | 0,1,…,9 | 0 | 0, 5 | same as preamble (= 0) | 0 |
| 1 | | | | | 1 |
| 2 | | | 1, 6 | | 0 |
| 3 | | | | | 1 |
| 4 | | | 2, 7 | | 0 |
| 5 | | | | | 1 |
| 6 | | | 3, 8 | | 0 |
| 7 | | | | | 1 |
| 8 | | | 4, 9 | | 0 |
| 9 | | | | | 1 |

FIG. 17

| Preamble part | | | Data part | |
|---|---|---|---|---|
| Preamble number | Cluster number | Interlace number | Cluster number | Interlace number |
| 0 | 0,1,⋯,9 | 0 | 0,1,⋯,9 | 1 |
| 1 | | | | 2 |
| 2 | | | | 3 |
| 3 | | | | 4 |

FIG. 19

| Preamble number | Preamble part | | Data part | |
|---|---|---|---|---|
| | Cluster number | Interlace number | Cluster number | Interlace number |
| 0 | 0,1,⋯,9 | 0 | 0, 3, 5 | same as preamble (= 0) |
| 1 | | | 1, 6, 8 | |
| 2 | | | 2, 7 | |
| 3 | | | 4, 9 | |

FIG. 21

TRANSMISSION DEVICE, RECEPTION DEVICE, TRANSMISSION METHOD, AND RECEPTION METHOD USING RANDOM ACCESS PREAMBLE

TECHNICAL FIELD

The present disclosure relates to a transmission apparatus, a reception apparatus, a transmission method, and a reception method.

BACKGROUND ART

In the standardization of 5G, a new radio access technology (NR) that is not necessarily backward compatible with LTE/LTE-Advanced has been discussed in 3GPP.

The operation in unlicensed bands has been discussed in NR as is the case with LTE License-Assisted Access (LTE-LAA). In LTE-LAA, the operation in unlicensed bands accompanying the operation in licensed bands has been supported. In NR, however, it is required to implement the operation in unlicensed bands without using licensed bands (Stand-alone operation).

Thus, studies have been carried out on introducing a Physical Random Access channel (PRACH), which is used for initial connection from a terminal (may be referred to as User Equipment (UE)) to a base station (may be referred to as gNB), to unlicensed bands in NR (see Non-Patent Literature 1, for example).

CITATION LIST

Non-Patent Literature

NPL 1
R2-1809940, LG Electronics Inc., "Considerations on 2-Step CBRA procedure for NR-U SA", 3GPP TSG-RAN WG2 Meeting #AH-1807
NPL 2
R1-1809726, Ericsson, "Feature lead summary for UL Signals and Channels", 3GPP TSG-RAN WG1 Meeting #94

SUMMARY OF INVENTION

Not enough studies have been carried out, however, on a random access method in NR.

One non-limiting and exemplary embodiment facilitates providing a transmission apparatus, a reception apparatus, a transmission method, and a reception method each capable of appropriately performing random access processing.

A transmission apparatus according to an embodiment of the present disclosure includes: transmission circuitry, which, in operation, transmits a data signal; and control circuitry, which, in operation, determines, based on a first resource used for transmission of a preamble signal, a second resource used for transmission of the data signal.

A reception apparatus according to an embodiment of the present disclosure includes: reception circuitry, which, in operation, receives a data signal; and control circuitry, which, in operation, determines a resource used for transmission of the data signal based on a resource used for transmission of a preamble signal.

A transmission method according to an embodiment of the present disclosure includes: determining a resource used for transmission of a data signal based on a resource used for transmission of a preamble signal; and transmitting the data signal.

A reception method according to an embodiment of the present disclosure includes: determining a resource used for transmission of a data signal based on a resource used for transmission of a preamble signal; and receiving the data signal.

It should be noted that general or specific embodiments may be implemented as a system, an apparatus, a method, an integrated circuit, a computer program, a storage medium, or any selective combination thereof.

According to an embodiment of the present disclosure, it is possible to appropriately perform random access processing.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 8 illustrates an exemplary correspondence between transmission resources for a Preamble part and a Data part according to Derivation Example 1 of Embodiment 1;

FIG. 10 illustrates another exemplary correspondence between transmission resources for the Preamble part and the Data part according to Derivation Example 1 of Embodiment 1;

FIG. 11 illustrates an exemplary correspondence between transmission resources for the Preamble part and the Data part according to Derivation Example 2 of Embodiment 1;

FIG. 13 illustrates an exemplary correspondence between transmission resources for the Preamble part and the Data part according to Derivation Example 3 of Embodiment 1;

FIG. 15 illustrates an exemplary correspondence between transmission resources for the Preamble part and the Data part according to Derivation Example 4 of Embodiment 1;

FIG. 17 illustrates an exemplary correspondence between transmission resources for the Preamble part and the Data part according to Derivation Example 5 of Embodiment 1;

FIG. 19 illustrates an exemplary correspondence between transmission resources for the Preamble part and the Data part according to Derivation Example 6 of Embodiment 1;

FIG. 21 illustrates an exemplary correspondence between transmission resources for the Preamble part and the Data part according to Derivation Example 7 of Embodiment 1.

DESCRIPTION OF EMBODIMENTS

Hereinafter, a detailed description will be given of embodiments of the present disclosure with reference to the accompanying drawings.

[Random Access Procedure]

Random access procedure in licensed bands is implemented, for example, in 4-step random access (may be referred to as a 4-step Random Access Channel (RACH), or 4-step Contention Based Random Access (CBRA)).

Figure 1:
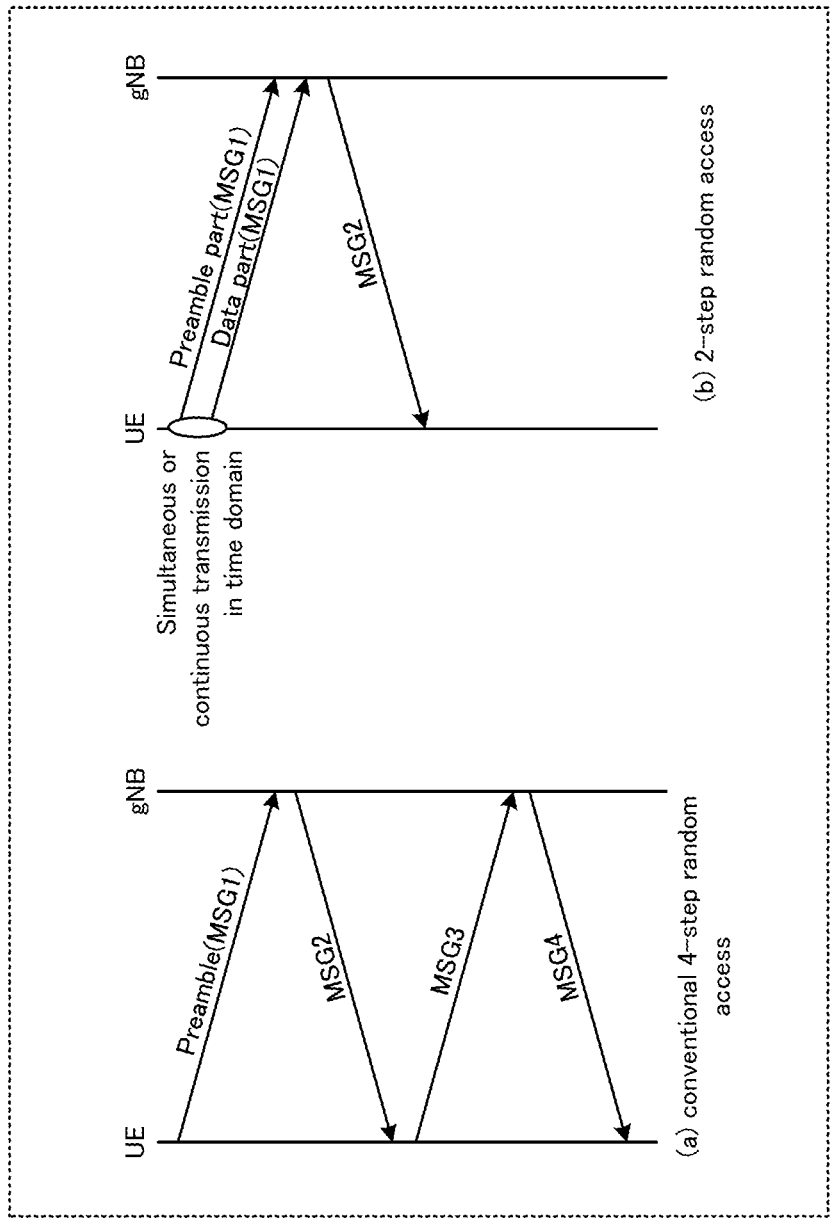
FIG. 1 illustrates an exemplary random access procedure.

In the 4-step random access, a terminal (UE) transmits a Preamble to a base station (gNB) as the first transmission (MSG 1), for example, as illustrated in (a) of FIG. 1. After receiving and decoding MSG 1, the base station indicates a response to the Preamble (RA response), scheduling information including the uplink transmission timing of MSG 3, and the like, to the terminal as the second transmission (MSG 2). After receiving and decoding MSG 2, the terminal indicates RRC connection request information, such as information on the terminal (e.g., a terminal ID), using the scheduling information indicated by MSG 2, to the base station as the third transmission (MSG 3). Lastly, the base station indicates control information for RRC connection of the terminal or control information for Contention resolution, for example, to the terminal as the fourth transmission (MSG 4). The control information for Contention resolution includes, for example, a control signal indicated from the terminal. In the Contention resolution, the terminal compares the control signal transmitted from the terminal with the control information for Contention resolution included in MSG 4. When the control signal and the control information are not the same information, the terminal restarts from MSG 1 in order to avoid RACH collision of a plurality of terminals, for example.

Meanwhile, studies have been carried out on introducing 2-step random access (may be referred to as a 2-step RACH or 2-step CBRA) as a random access procedure in unlicensed bands for NR (see, for example, NPL 1).

In the 2-step random access, a terminal transmits a Preamble part, which corresponds to the Preamble (or MSG 1) in (a) of FIG. 1, and a Data part, which corresponds to MSG 3 in (a) of FIG. 1, to a base station as the first transmission (MSG 1), for example, as illustrated in (b) of FIG. 1. The terminal may transmit the Preamble part and the Data part simultaneously, continuously, or within a specified time (e.g., within one slot).

Next, after receiving and decoding MSG 1, the base station indicates control information for uplink transmission timing and RRC connection of the terminal or control information for Contention resolution, which corresponds to MSG 2 and MSG 4 in (a) of FIG. 1, for example, to the terminal as the second transmission (MSG 2), as illustrated in (b) of FIG. 1.

The introduction of the 2-step random access to NR unlicensed bands is expected to bring effects of reducing Listen Before Talk (LBT) processing or reducing a delay time of random access, for example. Note that the introduction of the 2-step random access is not limited to the unlicensed bands. For example, studies have been carried out on reducing a delay time of data transmission and data reception by diverting the 2-step random access to licensed bands and applying it to services for Ultra-Reliable and Low Latency Communications (URLLC).

[PRACH]

A PRACH for the 4-step random access (e.g., MSG 1 in (a) of FIG. 1) used in NR licensed bands is constituted of a cyclic prefix (CP), a Preamble, and a guard period (GP), for example. The Preamble is generated from, for example, a code sequence having a proper correlation characteristic (e.g., a Cyclic shifted Zadoff-Chu (CS-ZC) sequence) and the like. The CP is a signal obtained by copying a part of the Preamble, and the GP is a non-transmission section. Note that the Preamble is not limited to the CS-ZC sequence, and may be any code sequence having a proper correlation characteristic.

The information on PRACH is indicated to the terminal as, for example, cell information of the base station. Different CS-ZC sequences are uniquely associated with respective Preamble numbers, for example. The terminal transmits a CS-ZC sequence corresponding to the randomly selected Preamble number as a Preamble. Even in a case where a plurality of terminals use the same time resource and frequency resource to transmit the PRACH, for example, the base station can simultaneously detect a plurality of Preamble numbers (in other words, Preambles of the plurality of terminals) by detecting correlation of the CS-ZC sequences when the plurality of terminals respectively select different Preamble numbers.

[B-IFDMA]

Studies have been carried out on applying a Block based interlace design (may be referred to as Block-interleaved Frequency Division Multiple Access (B-IFDMA)) as one of frequency resource allocation methods for PRACH (e.g., MSG 1 in (a) of FIG. 1), which is a channel for the 4-step random access in unlicensed bands (see, for example, NPL 2).

Figure 2:
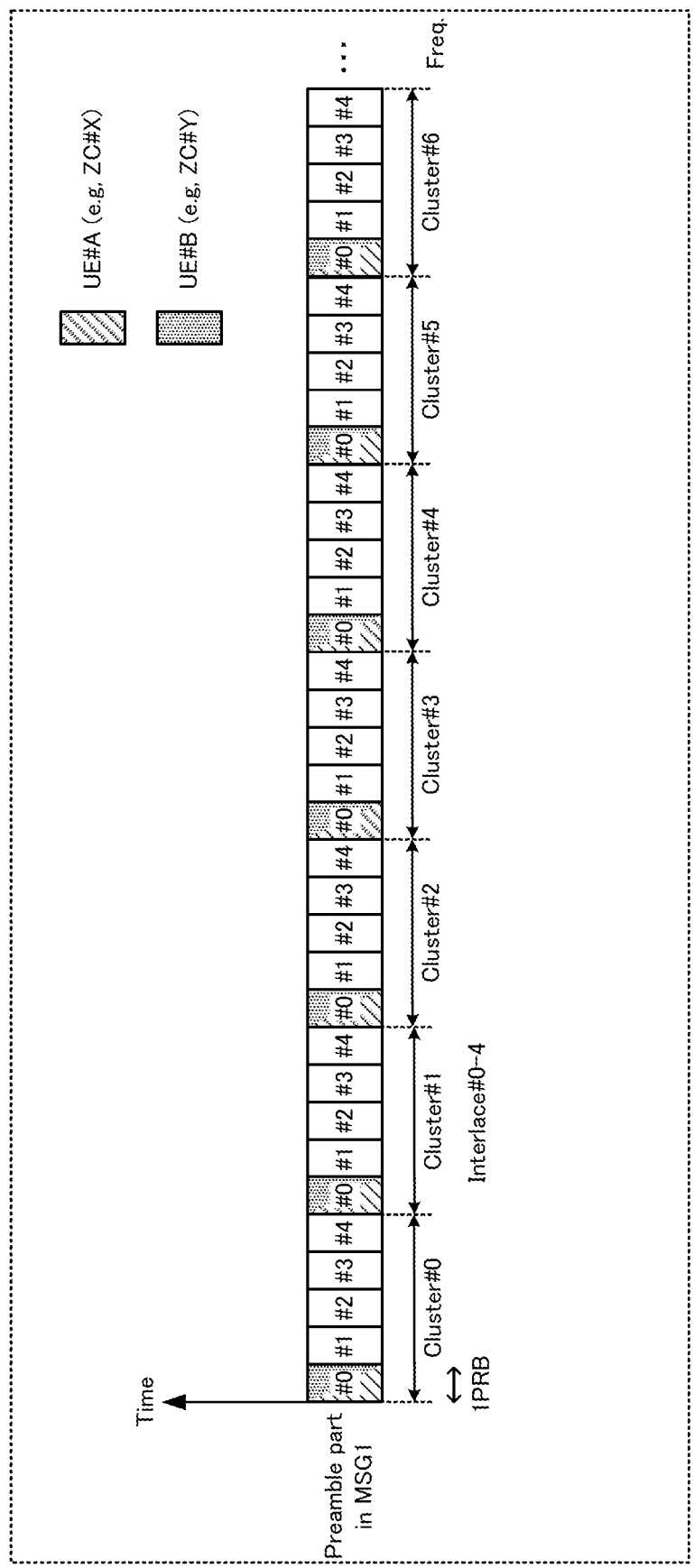
FIG. 2 illustrates an exemplary Block based interlace design.

FIG. 2 illustrates an exemplary Block based interlace design.

The Block based interlace design is used for frequency resource allocation methods for a Physical Uplink Shared Channel (PUSCH) in LTE-LAA. The B-IFDMA is a signal transmission method using a band called an interlace which is evenly dispersed in a frequency direction in a system band to observe the limitation of an Occupied Channel Bandwidth (OCB) in an unlicensed band and to reduce the impact of Power Spectral Density (PSD) limit.

The interlace is constituted of a group of consecutive subcarriers (a composite of consecutive frequency resources, e.g., 1 Physical Resource Block (PRB)). For example, a plurality of interlaces are included in a band obtained by dividing a system band or a partial band of the system band (e.g., a Bandwidth part (BWP)) into a plurality of blocks (hereinafter, referred to as a cluster or a cluster block). The interlaces included in each cluster are assigned with numbers (hereinafter, referred to as an "interlace number").

Note that the cluster has the similar meaning to an "interval" between the interlaces with the same interlace numbers. That is, the interlaces with the same interlace numbers are evenly dispersed in the frequency direction over a plurality of Cluster Blocks.

In addition, the cluster is not limited to the band obtained by dividing a system band into a plurality of blocks, and may be defined as a band obtained by dividing a certain band (e.g., a band where the listen before talk (LBT) is implemented, a band of 20 MHz, or a band of an integral multiple of 20 MHz) into a plurality of blocks.

In FIG. 2, interlace numbers of #0, #1, #2, #3, #4 are respectively allocated to 5 interlaces in a cluster obtained by dividing a certain band, for example. Cluster numbers #0, #1, #2, #3, and so forth are also assigned to respective clusters in FIG. 2.

Descriptions will be given of a case, for example, where a single interlace number (interlace #0 in FIG. 2) is configured for transmission resources for the PRACH, as illustrated in FIG. 2. When terminal A (UE #A) and terminal B (UE #B) select different Preamble numbers (e.g., different CS-ZC sequences (ZC #X and ZC #Y)) from each other, for example, the Preambles to be respectively transmitted from terminals A and B are code-multiplexed.

Incidentally, the radio resource allocation of the 2-step random access in NR unlicensed bands has not been fully discussed. No discussions have been made on, in particular, the radio resource allocation for the Data part of MSG 1 (e.g., see (b) of FIG. 1) in a case of applying the Block based interlace design (e.g., see FIG. 2) to the Preamble part of MSG 1.

As described above, when the Block based interlace design is applied to the radio resource allocation method for the Preamble part in the 2-step random access, different code sequences (e.g., CS-ZC sequences) are used for the Preambles of a plurality of terminals, which are generated from different Preamble numbers. This enables to code-multiplex the Preambles of the plurality of terminals in the frequency resources with the same interlace number.

The Data part in the 2-step random access, however, has a larger amount of information than that of the Preamble part, including several tens of bits of transmission information such as a terminal-specific ID. This makes it difficult to apply code multiplexing to the Data part similarly to the Preamble part.

When different CS-ZC sequences are uniquely associated with respective transmission information patterns of the Data part, for example, the number of CS-ZC sequences to be associated with the transmission information patterns may exceed the number of sequences that can be generated. Further, there arises problems of increasing the processing amount in the correlation detection in the base station or deteriorating the detection performance.

Thus, descriptions will be given hereinafter of a method for appropriately allocating radio resources for a Data part in a case where a terminal transmits PRACH in the 2-step random access.

Note that the "2-step random access" in the following description means a random access procedure where a Preamble part, which corresponds to MSG 1 of the 4-step random access, and a Data part, which corresponds to MSG 3 of the 4-step random access, are transmitted simultaneously, transmitted in consecutive radio resources, or transmitted in radio resources within a predetermined time (e.g., within a slot). In other words, the 2-step random access means a random access procedure where the Data part is transmitted with the Preamble part. Alternatively, the 2-step random access means a random access procedure where the terminal transmits the Data part before receiving a response to the Preamble, which corresponds to MSG 2 of the 4-step random access, or the terminal transmits the Data part without waiting for a response to the Preamble.

Embodiment 1

[Overview of Communication System]

A communication system according to an embodiment of the present disclosure includes terminal 100 and base station 200. In the following description, terminal 100, which corresponds to a transmission apparatus, transmits PRACH, and base station 200, which corresponds to a reception apparatus, receives the PRACH, as an example.

Figure 3:
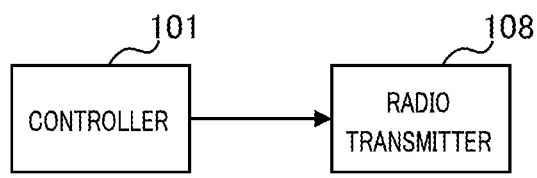
FIG. 3 is a block diagram illustrating a configuration of a part of a terminal according to Embodiment 1.

FIG. 3 is a block diagram illustrating a configuration of a part of terminal 100 according to the present embodiment. In terminal 100 illustrated in FIG. 3, radio transmitter 108 transmits a data signal (e.g., a Data part). Controller 101 determines, based on the first resource (e.g., a code sequence corresponding to a Preamble number) to be used for transmission of a preamble signal (e.g., a Preamble part), the second resource to be used for transmission of the data signal.

Figure 4:
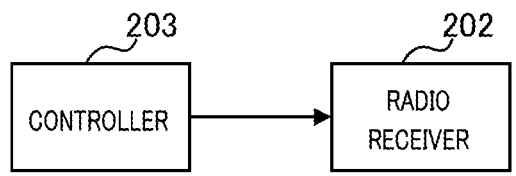
FIG. 4 is a block diagram illustrating a configuration of a part of a base station according to Embodiment 1.

FIG. 4 is a block diagram illustrating a configuration of a part of base station 200 according to the present embodiment. In base station 200 illustrated in FIG. 4, radio receiver 202 receives a data signal (e.g., a Data part). Controller 203 determines a resource to be used for transmission of the data signal based on a resource (e.g., a code sequence corresponding to a Preamble number) to be used for transmission of a preamble signal (e.g., a Preamble part).

[Configuration of Terminal]

Figure 5:
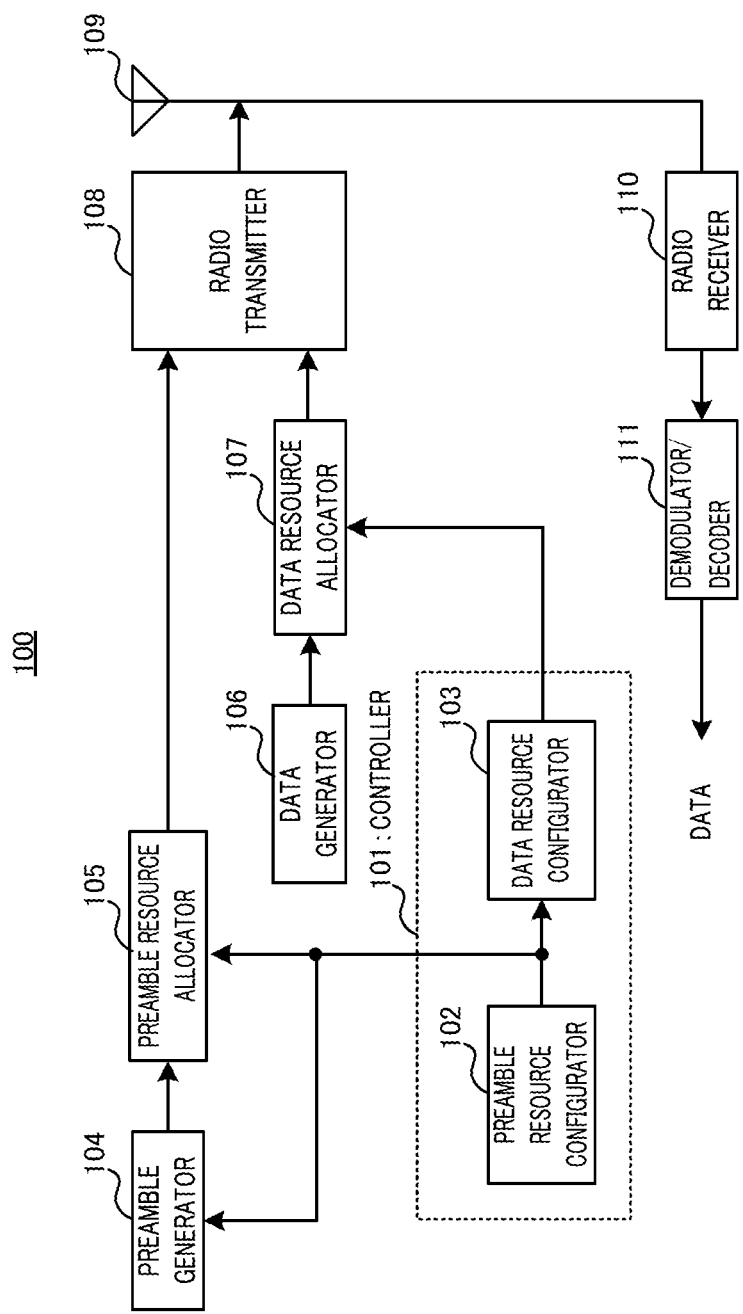
FIG. 5 is a block diagram illustrating a configuration of the terminal according to Embodiment 1.

FIG. 5 is a block diagram illustrating a configuration of terminal 100 according to the present embodiment.

In FIG. 5, terminal 100 includes controller 101, Preamble generator 104, Preamble resource allocator 105, Data generator 106, Data resource allocator 107, radio transmitter 108, antenna 109, radio receiver 110, and demodulator/decoder 111.

Controller 101 determines, for example, radio resources to which PRACH is allocated (e.g., allocation resources for a Preamble part and a Data part included in MSG 1 in the 2-step random access). Controller 101 includes Preamble resource configurator 102 and Data resource configurator 103, for example.

Preamble resource configurator 102 determines candidates for transmission resources to be allocated to the Preamble part based on, for example, PRACH transmission resource information (also referred to as Random access configuration) indicating available transmission resources for PRACH in a cell of base station 200. The transmission resources for the Preamble include, for example, frequency resources indicating frequency bands represented by interlace numbers and cluster numbers, or time resources such as transmission timings. In addition, the candidates for transmission resources to be allocated to the Preamble part are uniquely associated with Preamble numbers, for example.

Preamble resource configurator 102 randomly selects a single Preamble number from a group of Preamble numbers including at least one Preamble number, and outputs information indicating the selected Preamble number and the transmission resources associated with the Preamble number to Data resource configurator 103, Preamble generator 104, and Preamble resource allocator 105.

Note that information on PRACH transmission resources available for terminal 100 includes, for example, configuration information on PRACH such as a sequence number for the Preamble, a CS value, a PRACH time resource (e.g., a cycle), a PRACH frequency resource position, and a Preamble format number. Further, the PRACH transmission resource information is included in the control information broadcast from base station 200 (e.g., a serving cell) to be connected, and indicated to terminal 100 in advance. Note that a part of the PRACH transmission resource information may be, for example, system common information defined in the specification and may not be indicated to terminal 100 from base station 200.

Data resource configurator 103 determines transmission resources for the Data part based on the transmission resources for the Preamble part to be inputted from Preamble resource configurator 102. For example, Data resource configurator 103 configures the transmission resources for the Data part based on the Preamble number to be inputted from Preamble resource configurator 102. The transmission resources for the Data part include, for example, frequency resources represented by interlace numbers and cluster numbers, or time resources such as transmission timings. Data resource configurator 103 outputs the information indicating the configured transmission resources to Data resource allocator 107. Note that the details of a method for deriving transmission resources for the Data part in Data resource configurator 103 will be described later.

Preamble generator 104 generates a CS-ZC sequence by using the information indicating the transmission resources (e.g., a sequence number corresponding to the selected Preamble number and a cyclic shift value) to be inputted from Preamble resource configurator 102, and outputs the generated CS-ZC sequence to Preamble resource allocator 105 as a Preamble part signal (or a preamble signal). Herein, Preamble generator 104 generates different code sequences (e.g. CS-ZC sequences) that are orthogonal or less correlated when the Preamble numbers selected in Preamble resources configurator 102 are different.

Preamble resource allocator 105 allocates the Preamble part signal to be inputted from Preamble generator 104 to the transmission resource information (e.g., frequency resources corresponding to the cluster number and the interlace number) to be inputted from Preamble resource configurator 102. In addition, Preamble resource allocator 105 outputs the Preamble part signal to radio transmitter 108 based on the transmission timing indicated in the transmission resource information to be inputted from Preamble resource configurator 102.

Data generator 106, for example, generates a data signal (corresponding to MSG 3 in the 4-step random access, for example) including RRC connection request information and the like such as a terminal ID. Data generator 106 encodes and modulates the generated data signal and outputs the modulated signal (a data sequence) to Data resource allocator 107 as a Data part signal.

Data resource allocator 107 allocates, for the Data part signal to be inputted from Data generator 106, the frequency resources corresponding to the cluster number and the interlace number indicated in the transmission resource information to be inputted from Data resource configurator 103. In addition, Data resource allocator 107 outputs the Data part signal to radio transmitter 108 based on the transmission timing indicated in the transmission resource information to be inputted from Data resource configurator 103.

Radio transmitter 108 performs transmission processing such as D/A conversion and up-conversion on the Preamble part signal to be inputted from Preamble resource allocator 105 and the Data part signal to be inputted from Data resource allocator 107, and transmits a radio signal obtained by the transmission processing (corresponding to MSG 1 (see (b) of FIG. 1) in the 2-step random access, for example) to base station 200 via antenna 109.

Radio receiver 110 performs reception processing such as down-conversion and A/D conversion to the received signal received from base station 200 via antenna 109, and outputs the received signal obtained by the reception processing to demodulator/decoder 111. The received signal received from base station 200 includes, for example, a response data signal to PRACH in the 2-step random access (e.g., MSG 2 illustrated in (b) of FIG. 1).

Demodulator/decoder 111 demodulates and decodes the received signal to be inputted from radio receiver 110. RRC connection processing by the 2-step random access is completed when demodulator/decoder 111 appropriately receives the response data signal to PRACH.

[Configuration of Base Station]

Figure 6:
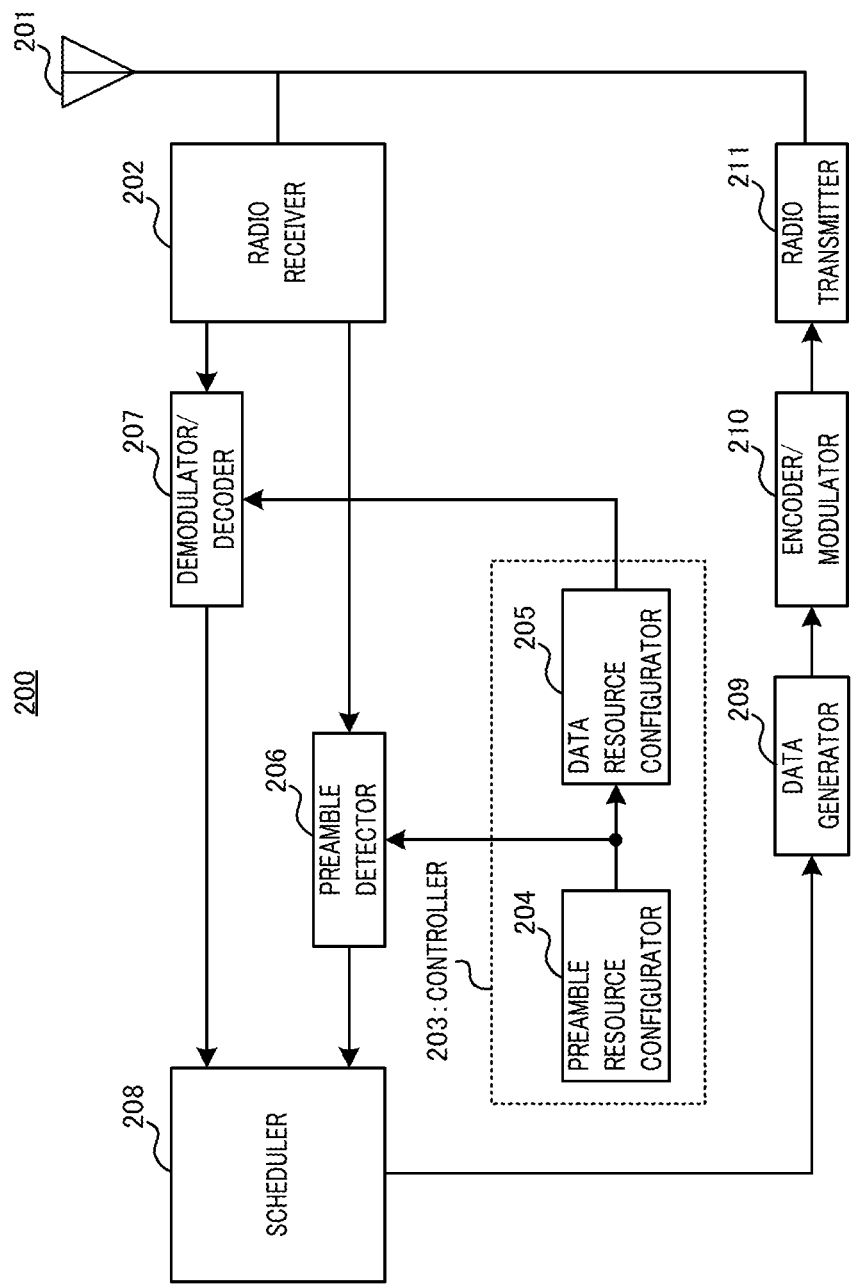
FIG. 6 is a block diagram illustrating a configuration of the base station according to Embodiment 1.

FIG. 6 is a block diagram illustrating a configuration of base station 200 according to the present embodiment.

In FIG. 6, base station 200 includes antenna 201, radio receiver 202, controller 203, Preamble detector 206, demodulator/decoder 207, scheduler 208, data generator 209, encoder/modulator 210, and radio transmitter 211.

Radio receiver 202 performs reception processing such as down-conversion and A/D conversion to the PRACH signal received from terminal 100 via antenna 201 (e.g., MSG 1 in the 2-step random access), for example, in PRACH transmission resources available in a cell of base station 200, and outputs a signal obtained by the reception processing to Preamble detector 206 and demodulator/decoder 207.

Controller 203 determines, for example, radio resources to which each terminal 100 assigns PRACH (e.g., allocation resources for the Preamble part and the Data part included in MSG 1 in the 2-step random access). Note that the configuration method for PRACH transmission resources in controller 203 is similar to the configuration method for PRACH transmission resources in terminal 100 (controller 101). Controller 203 includes Preamble resource configurator 204 and Data resource configurator 205, for example.

Preamble resource configurator 204 outputs, for example, the Preamble numbers available in the cell of base station 200 to Data resource configurator 205 and Preamble detector 206.

Data resource configurator 205 configures transmission resources for the Data part based on the Preamble number to be inputted from Preamble resource configurator 204. Data resource configurator 205 outputs the information indicating the configured transmission resources to demodulator/decoder 207. Note that the details of a method for deriving transmission resources for the Data part in Data resource configurator 205 will be described later.

Preamble detector 206 generates a replica signal for detecting a PRACH preamble (e.g., a CS-ZC sequence) by using a sequence number and a CS number corresponding to the Preamble number to be inputted from Preamble resource configurator 204. Preamble detector 206 performs correlation processing between the generated replica signal and the signal to be inputted from radio receiver 202, detects the PRACH preamble, and estimates the timing. Preamble detector 206 outputs the detection result and the estimation result to scheduler 208.

Note that the correlation processing in Preamble detector 206 may be calculation processing of a delay profile used in the timing estimation by performing the correlation processing in a time domain, or may be calculation processing of a delay profile by performing the correlation processing (division processing) in a frequency domain and performing Inverse Fast Fourier Transform (IFFT) after the correlation processing.

Demodulator/decoder 207 demodulates and decodes the received data (the Data part signal), included in the transmission resources indicated in the transmission resource information to be inputted from Data resource configurator 205, from the reception signal to be inputted from radio receiver 202, and outputs the decoded result to scheduler 208.

Scheduler 208 establishes the RRC connection with terminal 100 based on the timing information of terminal 100 to be inputted from Preamble detector 206, the terminal ID information included in the Data part signal to be inputted from the demodulator/decoder 207, or the like. Scheduler 208 configures, for example, data transmission resources including control information for the RRC connection on the terminal 100 side or control information for Contention resolution, and outputs the data transmission resource information to data generator 209.

Note that, in base station 200, controller 203, Preamble detector 206, and demodulator/decoder 207, for example, attempt to detect the Preamble part, and perform demodulation/decoding processing on the Data part signal for each of the Preamble numbers available in the cell of base station 200. Meanwhile, scheduler 208 performs RRC connection processing on terminal 100 in which the decoding result of the Data part signal turns to be OK (no error).

Data generator 209 generates data including the control information for the RRC connection on the terminal side or the control information for Contention resolution by using radio resources indicated in the data transmission resource information to be inputted from scheduler 208, and outputs the generated data signal (corresponding to MSG 2 in the 2-step random access, for example) to encoder/modulator 210.

Encoder/modulator 210 modulates and encodes the data signal to be inputted from data generator 209, and outputs the modulated signal to radio transmitter 211.

Radio transmitter 211 performs transmission processing such as D/A conversion, up-conversion, and amplification on the signal to be inputted from encoder/modulator 210, and outputs a radio signal obtained by the transmission processing (e.g., MSG 2 in the 2-step random access (see, for example, (b) of FIG. 1) to terminal 100 via antenna 201.

[Operations of Terminal 100 and Base Station 200]

Operation examples of terminal 100 and base station 200 including the above-described configurations will be described.

Figure 7:
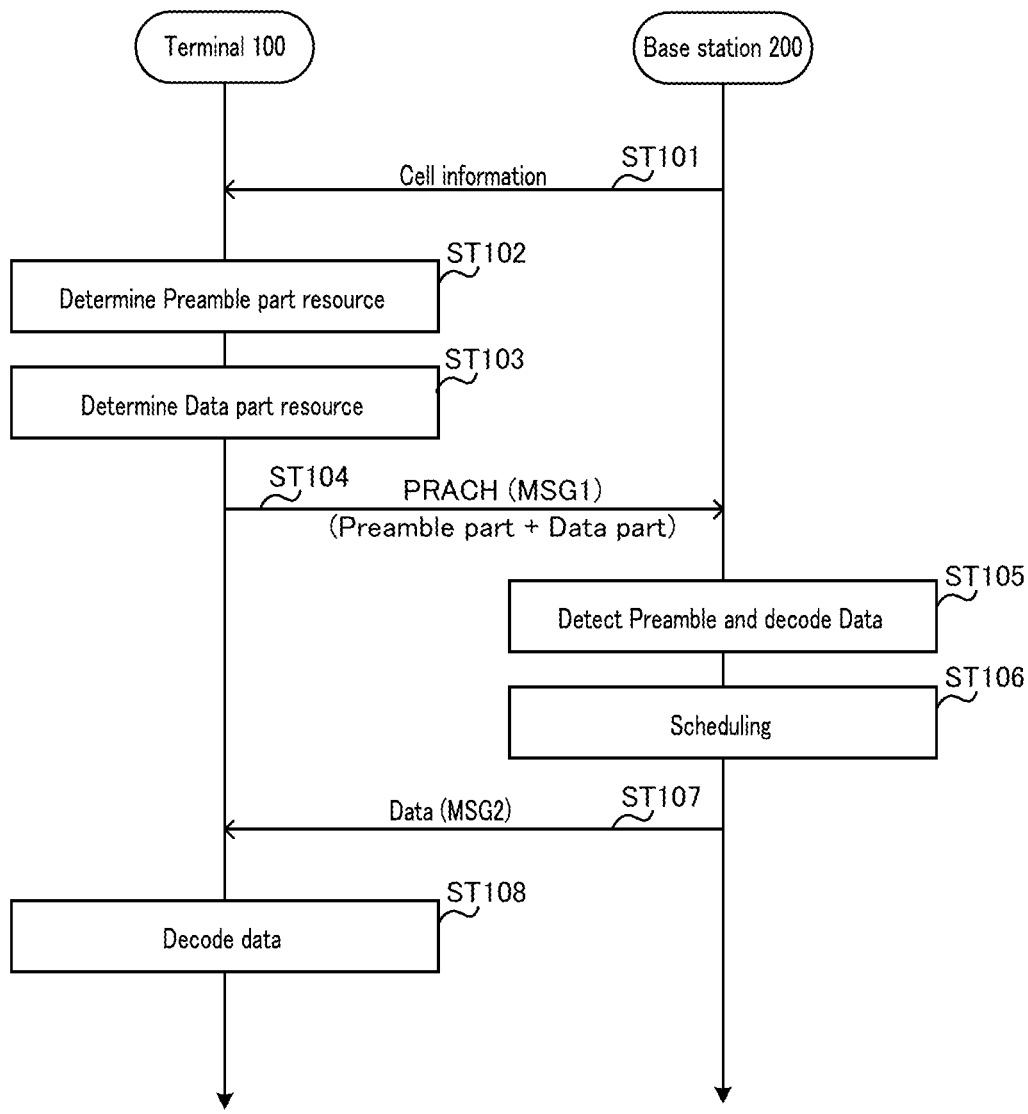
FIG. 7 is a sequence diagram illustrating exemplary operations of the terminal and the base station according to Embodiment 1.

FIG. 7 is a sequence diagram illustrating exemplary operations of terminal 100 (FIG. 5) and base station 200 (FIG. 6).

In FIG. 7, base station 200 indicates (i.e., broadcasts) cell information including information on PRACH transmission resources available in a cell to terminal 100 (ST101).

Terminal 100 determines transmission resources for a Preamble part signal included in PRACH to be transmitted from terminal 100, based on the PRACH transmission resource information indicated in the cell information (ST102).

Terminal 100 determines transmission resources for a Data part signal based on the determined transmission resources for the Preamble part signal (ST103).

Terminal 100 transmits a PRACH signal (e.g., MSG 1 in the 2-step random access) including the Preamble part signal and the Data part signal to base station 200 using the determined transmission resources (ST104).

Base station 200 detects the Preamble part signal and decodes the Data part signal (ST105). Base station 200 establishes RRC connection between the corresponding terminal 100 and base station 200 when the decoding of the Data part signal turns to be OK, and determines (schedules) transmission resources for a response signal (e.g., MSG 2 in the 2-step random access) including control information for the RRC connection on the terminal side or control information for Contention resolution (ST106). Base station 200 transmits the data signal including the response signal to terminal 100 (ST107).

Terminal 100 decodes the data signal, and terminates the RRC connection processing with base station 200 by the 2-step random access when the data signal is decoded without error and no collision with RACH of another terminal is detected (ST108). Note that terminal 100, for example, restarts the random access from the process in ST102 when the data signal is decoded with an error or a collision with RACH of another terminal is detected.

[Configuration Method for Transmission Resource for Data Part]

Next, descriptions will be given of an exemplary configuration method for transmission resources for a Data part in Data resource configurator 103 of terminal 100 and Data resource configurator 205 of base station 200.

In the present embodiment, the transmission resources for the Data part are configured (i.e., derived) based on the transmission resources for a Preamble part when a Block based interlace design is applied to the Preamble part in the 2-step random access.

For example, terminal 100 and base station 200 derive frequency resources and time resources for the Data part based on at least a Preamble number and an Interlace number of the Preamble part. In other words, the Data parts of a plurality of terminals are demultiplexed and multiplexed by frequency resources or time resources when the Block based interlace design is applied to the Preamble part in the 2-step random access.

As described later, the Preamble numbers and the transmission resources for the Data part are, for example, associated with each other such that the transmission resources (e.g., cluster numbers, interlace numbers, or transmission symbol positions) for the Data part corresponding to each of a plurality of Preamble numbers are different from each other.

Thus, the Preamble parts of a plurality of terminals 100 are code-multiplexed on the same interlace, and the Data parts of the plurality of terminals 100 are frequency-multiplexed or time-multiplexed.

In addition, PRACH can easily be frequency-multiplexed with other uplink channels to which the Block based interlace design is applied (e.g., Physical Uplink Shared Channel (PUSCH), Physical Uplink Control Channel (PUCCH), Sounding Reference Signal (SRS), etc.) by, for example, making the interlace numbers different between PRACH and those other uplink channels.

Further, terminal 100 and base station 200 derive the transmission resources for the Data part from the predetermined correspondence with the Preamble part, thereby reducing the signaling for indicating the transmission resources for the Data part.

Note that the correspondence between the transmission resources for the Preamble part (e.g., Preamble number) and those for the Data part may be defined in advance in the specification. This eliminates the need for new signaling for the introduction of the 2-step random access. Alternatively, the correspondence between the transmission resources for the Preamble part and the Data part may be broadcasted as the cell information. In this case, the correspondence may be updated quasi-statically according to the communication environment in the cell.

Incidentally, the transmission resources for the Data part may be derived using the information indicated to terminal 100 from base station 200, in addition to the derivation processing to be described below.

Hereinafter, derivation examples 1 to 7 of the transmission resources for the Data part will be each described.

Derivation Example 1

FIG. 8 illustrates an exemplary correspondence between transmission resources for the Preamble part and the Data part according to Derivation Example 1.

In FIG. 8, one interlace (e.g., interlace number 0) in each of ten clusters (e.g., cluster numbers 0 to 9) is configured for the transmission resource for the Preamble part, as an example. In other words, the transmission resource for the Preamble part is dispersedly allocated in each of a plurality of bands (e.g., clusters #0 to #9). Additionally, five Preamble numbers 0 to 4 are configured for terminal 100 in FIG. 8, as an example. The Preamble numbers are associated with different code sequences (e.g., CS-ZC sequences) from each other. Terminal 100, for example, randomly selects a single Preamble number among the Preamble numbers 0 to 4.

Further, as illustrated in FIG. 8, the transmission resources for the Data part are configured with the interlace that has been configured for the Preamble part (the interlace number 0 in FIG. 8) in Derivation Example 1. Note that the interlace number configured for the transmission resources for the Data part may be different from the interlace number for the Preamble part.

In addition, as illustrated in FIG. 8, the transmission resources for the Data part are allocated in some of the plurality of clusters configured for the transmission resources for the Preamble in Derivation Example 1. In other words, the transmission resources for the Data part is limited to some of the clusters (or cluster numbers) configured for the Preamble part. Further, as illustrated in FIG. 8, the clusters configured for the transmission resources for the Data part are associated with a Preamble number (i.e., a code sequence) configured for the Preamble part. For example, each Preamble number is associated with different cluster numbers from each other as the transmission resources for the Data part, as illustrated in FIG. 8. The clusters associated with each Preamble number are separated by five clusters as an example in FIG. 8.

Figure 9:
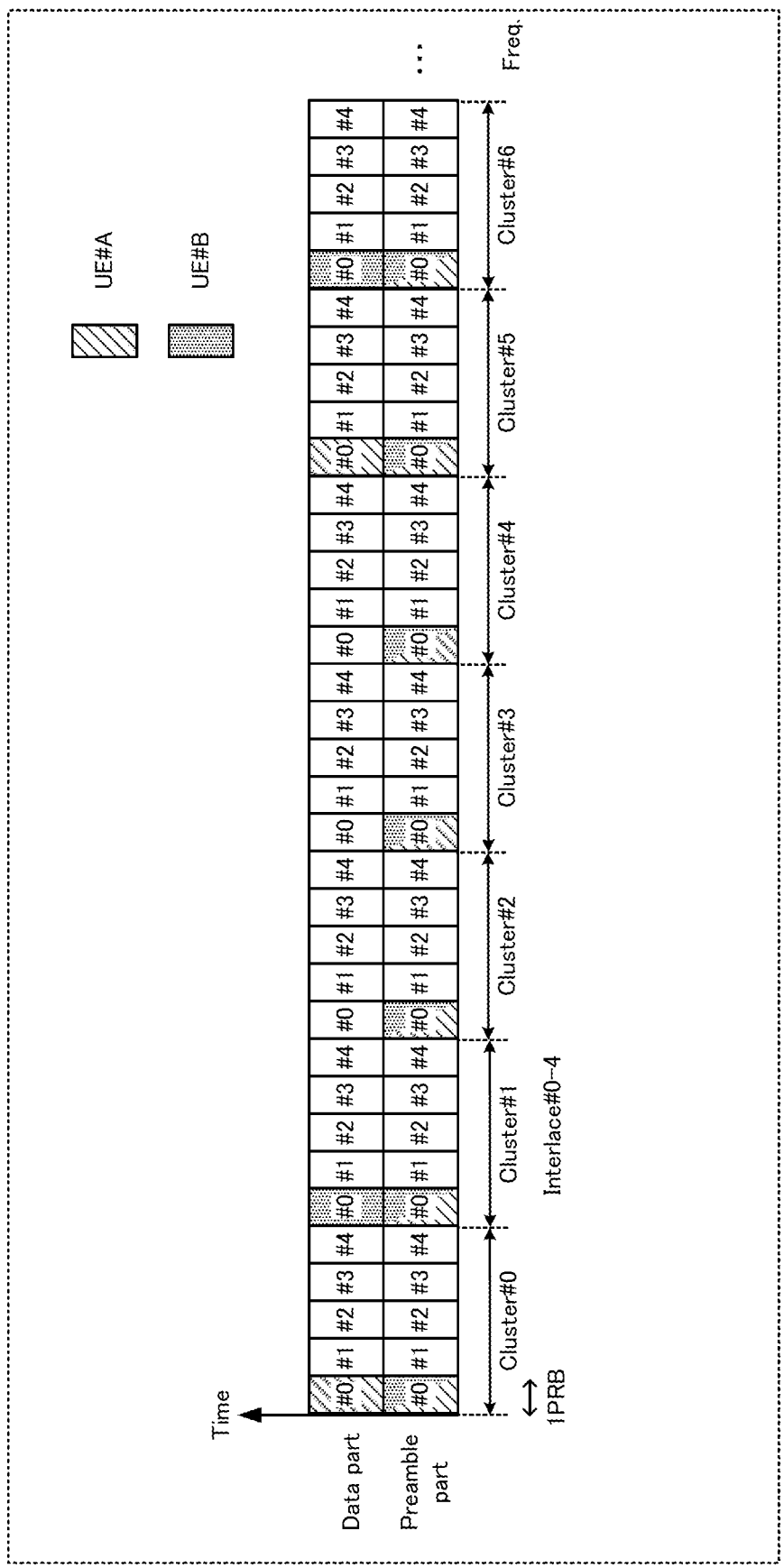
FIG. 9 illustrates an exemplary transmission resource allocation according to Derivation Example 1 of Embodiment 1.

FIG. 9 illustrates an exemplary configuration of the transmission resources for terminal 100 in Derivation Example 1.

In FIG. 9, the horizontal axis indicates a frequency domain (or frequency resource allocation). For example, in FIG. 9, the interlace bandwidth is 1 PRB, the cluster bandwidth is 5 PRBs (i.e., 5 interlaces), the interlace numbers are 0 to 4, and the cluster numbers are #0, #1, #2, and so forth. Meanwhile, the vertical axis indicates a time domain (e.g., time resource allocation) in FIG. 9. FIG. 9 shows two symbols (Orthogonal Frequency Division Multiplexing (OFDM) symbols including Cyclic Prefixes (CPs) in the case of OFDM), for example. Note that a symbol length of the Preamble part and that of the Data part may be different from each other.

In addition, FIG. 9 illustrates an example in which terminal A (UE #A) selects the Preamble number 0 shown in FIG. 8 and terminal B (UE #B) selects the Preamble number 1 shown in FIG. 8.

As illustrated in FIG. 9, each Preamble part of terminals A and B is allocated to the interlace number 0 of the frequency band in each cluster. In the frequency band, mutually different CS-ZC sequences associated with each of the Preamble number 0 and the Preamble number 1 are used for the respective Preamble parts of terminals A and B. Thus, the Preamble parts of terminals A and B are code-multiplexed in the same interlace, and can be demultiplexed in base station 200.

Further, as illustrated in FIG. 9, the Data part of terminal A is allocated to the interlace number 0 of the frequency band, which is the same as the Preamble part, in the clusters with the cluster numbers 0 and 5. Similarly, as illustrated in FIG. 9, the Data part of terminal B is allocated to the interlace number 0 of the frequency band, which is the same as the Preamble part, in the clusters with the cluster numbers 1 and 6.

As described above, different clusters (or cluster numbers) from one another are used for the transmission resources for each of the Data parts of terminals A and B. Thus, the Data parts of terminals A and B with different Preamble numbers are frequency-multiplexed in orthogonal frequency resources, and can be demultiplexed in base station 200.

Therefore, Derivation Example 1 makes it possible to frequency-multiplex the Data part signals to be transmitted from a plurality of terminals 100 without new signaling on the transmission resources for the Data part.

Herein, there is a specification, for example, of a temporarily operation defined for an Orthogonal Frequency Division Multiple Access (OFDMA) signal of IEEE 802.11ax (e.g., a specification that the bandwidth of some signals only needs to be 2 MHz or more when other signals meet the OCB requirement of 80-100% in the same Channel Occupancy Time (COT)). In this regard, in Derivation Example 1, the band for the Data part signals, for example, only needs to be 2 MHz or more because the Preamble part signals meet the OCB requirement of 80-100% as illustrated in FIG. 8, for example.

Further, the example illustrated in FIG. 8 shows that the Data part signals of each terminal 100 are allocated to clusters with cluster numbers relatively distant from each other (cluster intervals: 5, in FIG. 8). This allows terminal 100 to transmit the Data part signals over a wide band, thereby obtaining the frequency diversity gain and improving the reception performance of the Data part signals.

Note that the transmission resources for the Data part are not limited to the examples illustrated in FIG. 8. For example, when terminal 100 can estimate the uplink reception quality and identify high quality clusters in a case of Time Division Duplexing (TDD) or the like, the Data part signals may be allocated to clusters with relatively close cluster numbers, as illustrated in FIG. 10. The cluster numbers associated with each Preamble number are consecutive numbers in FIG. 10, for example. This allows terminal 100 to transmit the Data part signals selecting clusters (i.e., Preamble numbers) that can be expected to be high quality, thereby improving the reception performance of the Data part signals.

Note that the transmission resources (e.g., cluster numbers) for the Data part illustrated in FIG. 8 and FIG. 10 are examples, and the cluster numbers associated with each Preamble number for the Data part are not limited thereto.

Derivation Example 2

FIG. 11 illustrates an exemplary correspondence between transmission resources for the Preamble part and the Data part according to Derivation Example 2.

In FIG. 11, the transmission resources for the Preamble part are similar to those in Derivation Example 1 (see, for example, FIG. 8 or FIG. 9).

As illustrated in FIG. 11, the transmission resources for the Data part are configured with the interlace that has been configured for the Preamble part (the interlace number 0 in FIG. 11) in Derivation Example 2, as is the case with Derivation Example 1. Note that the interlace number configured for the transmission resources for the Data part may be different from the interlace number of the Preamble part.

In addition, the transmission resources for the Data part are allocated in some of the plurality of clusters configured for the transmission resources for the Preamble in the frequency domain in Derivation Example 2, as is the case with Derivation Example 1. Further, in Derivation Example 2, the transmission resources for the Data part are allocated in three symbols (Symbol #0, Symbol #1, and Symbol #2) in the time domain, as illustrated in FIG. 11.

In Derivation Example 2, the clusters configured for the transmission resources for the Data part are associated with a Preamble number (i.e., a code sequence) configured for the Preamble part, as illustrated in FIG. 11. At this time, the clusters configured for the transmission resources for the Data part are different for each symbol (Symbol #0, Symbol #1 and Symbol #2 in FIG. 11). For example, as illustrated in FIG. 11, each Preamble number is associated with different cluster numbers from each other for each symbol as the transmission resources for the Data part.

Figure 12:
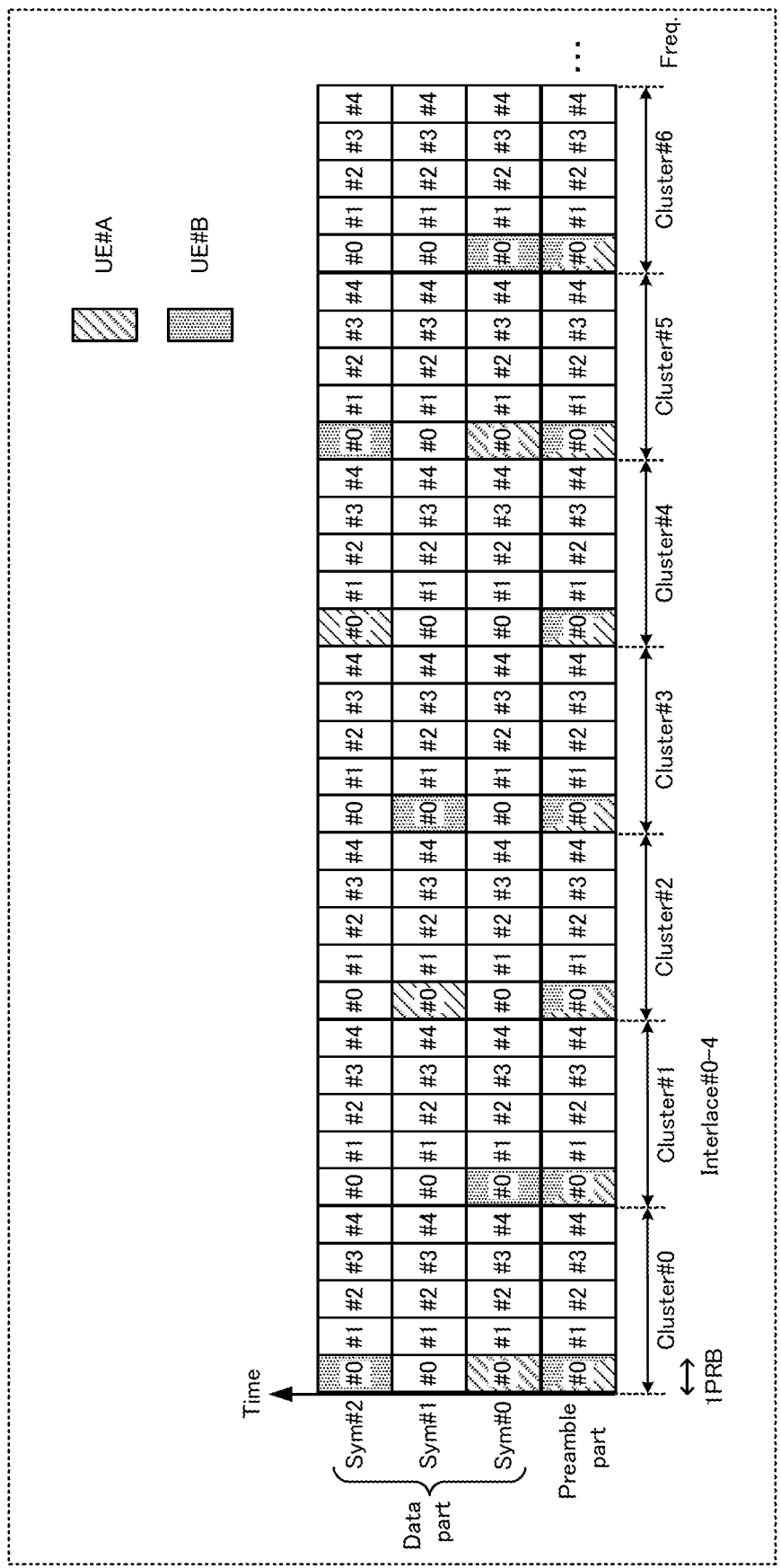
FIG. 12 illustrates an exemplary transmission resource allocation according to Derivation Example 2 of Embodiment 1.

FIG. 12 illustrates an exemplary configuration of the transmission resources for terminal 100 in Derivation Example 2.

In FIG. 12, the horizontal axis indicates the frequency domain (or frequency resource allocation), and the vertical axis indicates the time domain (e.g., time resource allocation). In addition, the configurations of the clusters and the interlaces in the clusters illustrated in FIG. 12 are similar to those in Derivation Example 1 (e.g., FIG. 9). In FIG. 12, however, one symbol is configured for the Preamble part and three symbols are configured for the Data part in the time domain.

Further, FIG. 12 illustrates an example in which terminal A (UE #A) selects the Preamble number 0 shown in FIG. 11 and terminal B (UE #B) selects the Preamble number 1 shown in FIG. 11.

As illustrated in FIG. 12, each of the Preamble parts of terminals A and B is allocated to the interlace number 0 of the frequency band in each cluster, and different CS-ZC sequences associated with each of the Preamble number 0 and the Preamble number 1 are used for each of the Preamble parts of terminals A and B, as is the case with FIG. 9.

As illustrated in FIG. 12, the Data part of terminal A is allocated to the interlace number 0 of the frequency band, which is the same as the Preamble part, in the clusters with the cluster numbers 0 and 5 in symbol 0 (Sym #0), in the clusters with the cluster numbers 2 and 7 (the cluster number 7 is not illustrated) in symbol 1 (Sym #1), and in the clusters with the cluster numbers 4 and 9 (the cluster number 9 is not illustrated) in symbol 2 (Sym #2).

Similarly, as illustrated in FIG. 12, the Data part of terminal B is allocated to the interlace number 0 of the frequency band, which is the same as the Preamble part, in the clusters with the cluster numbers 1 and 6 in symbol 0 (Sym #0), in the clusters with the cluster numbers 3 and 8 (the cluster number 8 is not illustrated) in symbol 1 (Sym #1), and in the clusters with the cluster numbers 0 and 5 in symbol 2 (Sym #2).

As described above, different clusters (or cluster numbers) from one another are used for the transmission resources for each of the Data parts of terminals A and B in each symbol. Thus, the Data parts of terminals A and B with different Preamble numbers are frequency-multiplexed in the frequency resources orthogonal in each symbol, and can be demultiplexed in base station 200.

Further, in Derivation Example 2, the Data part signals of each terminal 100 are frequency-hopped among a plurality of symbols, thereby improving the reception performance of the Data part signals by the frequency diversity gain.

Note that although FIG. 12 illustrates an example in which the Data part signals of each terminal 100 are frequency-hopped among a plurality of symbols, the Data part signals of each terminal 100 may be allocated to the same frequency band in a plurality of symbols.

Derivation Example 3

FIG. 13 illustrates an exemplary correspondence between transmission resources for the Preamble part and the Data part according to Derivation Example 3.

In FIG. 13, the transmission resources for the Preamble part are similar to those in Derivation Example 1 (see, for example, FIG. 8 or FIG. 9). In FIG. 13, however, ten Preamble numbers 0 to 9 are configured for terminal 100, as an example. Each Preamble number is associated with a different code sequence (e.g., a CS-ZC sequence) from each other. Terminal 100, for example, randomly selects a single Preamble number among the Preamble numbers 0 to 9.

Additionally, in Derivation Example 3, the transmission resources for the Data part are configured with the interlace configured for the Preamble part (the interlace number 0 in FIG. 13) and some of the clusters among the clusters (or cluster numbers) configured for the Preamble part as illustrated in FIG. 13, as is the case with Derivation Example 1 (see, for example, FIG. 8 or FIG. 9).

Further, in Derivation Example 3, the transmission resources for the Data part are configured with at least one sub-PRB included in the clusters to be configured.

Herein, the sub-PRB is, for example, a resource unit obtained by dividing 1 PRB (12 subcarriers in LTE or NR) in units of one or a plurality of subcarriers (e.g., 4 subcarriers or 6 subcarriers). In other words, the sub-PRB is a resource unit included in each interlace of a plurality of clusters for the transmission resources for the Preamble part. Note that the number of subcarriers constituting 1 PRB (or one interlace in each cluster) is not limited to 12 subcarriers, and the number of subcarriers constituting the sub-PRB (i.e., the number of divisions of 1 PRB) is not limited to 4 or 6 subcarriers. The sub-PRB illustrated in FIG. 13 is a resource unit obtained by dividing 1 PRB into two units.

As illustrated in FIG. 13, the transmission resources for the Data part include, for example, at least one sub-PRB among a plurality of sub-PRBs included in the clusters in which the transmission resources for the Preamble part are allocated.

The at least one sub-PRB configured for the transmission resources for the Data part is associated with a Preamble number (i.e., a code sequence) configured for the Preamble part. At this time, different sub-PRB numbers are associated with a plurality of Preamble numbers where the same cluster numbers are configured for the transmission resources for the Data part. For example, in FIG. 13, sub-PRB number 0 (sub-PRB #0) and sub-PRB number 1 (sub-PRB #1) are respectively associated with the Preamble numbers 0 and 1 as a group. The same applies to other groups of Preamble numbers with which the same cluster numbers are associated.

In other words, the resources where at least either one of the cluster number or the sub-PRB number is different are associated with respective Preamble numbers illustrated in FIG. 13 as the transmission resources for the Data part.

Figure 14:
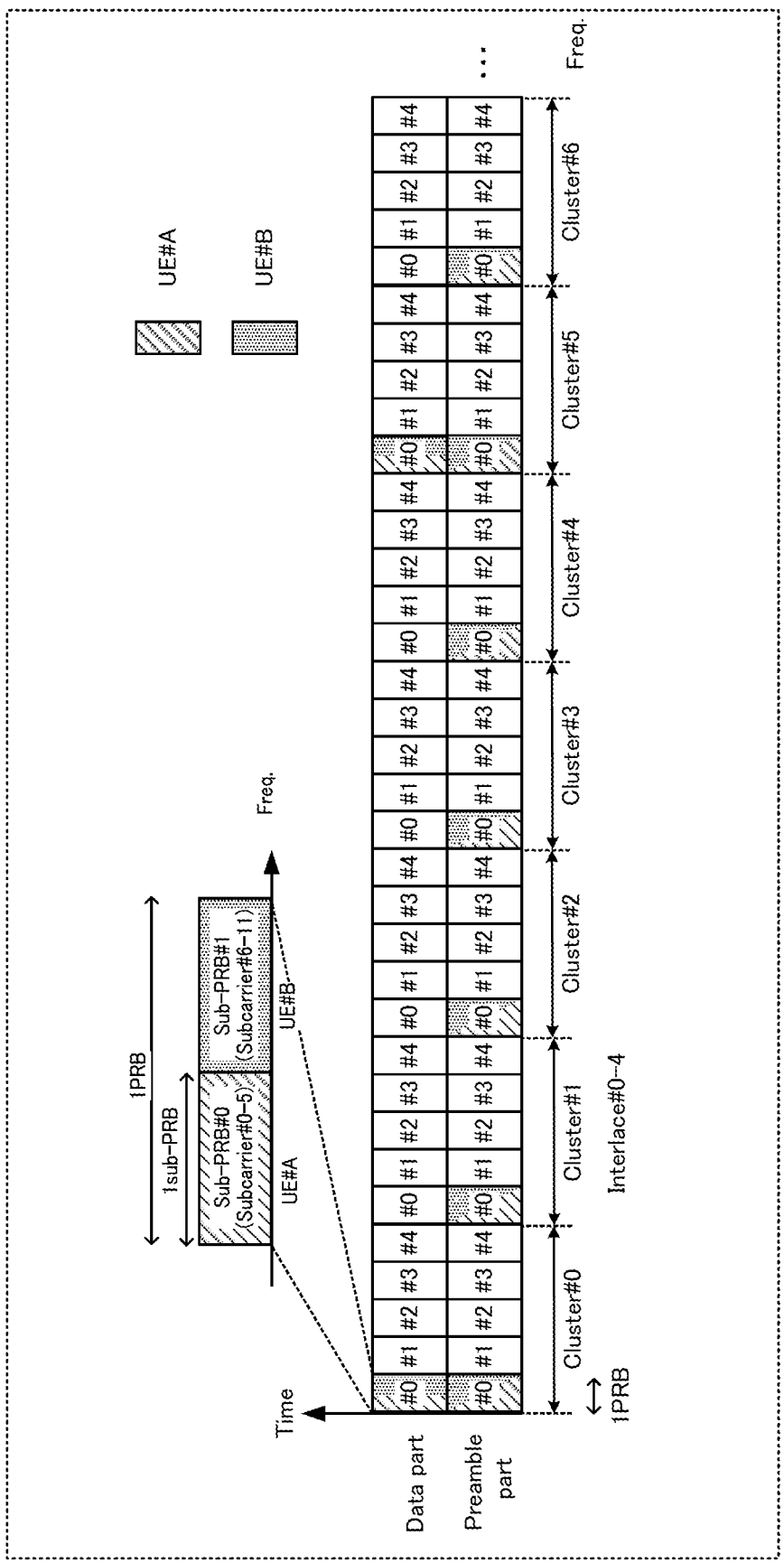
FIG. 14 illustrates an exemplary transmission resource allocation according to Derivation Example 3 of Embodiment 1.

FIG. 14 illustrates an exemplary configuration of the transmission resources for terminal 100 in Derivation Example 3.

In FIG. 14, the horizontal axis indicates a frequency domain (or frequency resource allocation), and the vertical axis indicates a time domain (e.g., time resource allocation). In addition, the configurations of the clusters and the interlaces in the clusters illustrated in FIG. 14 are similar to those in Derivation Example 1 (e.g., FIG. 9). In FIG. 14, however, each PRB (e.g., 12 subcarriers #0 to #11) is constituted of sub-PRB #0 (e.g., subcarriers #0 to #5) and sub-PRB #1 (e.g., subcarriers #6 to #11).

In addition, FIG. 14 illustrates an example in which terminal A (UE #A) selects the Preamble number 0 shown in FIG. 13 and terminal B (UE #B) selects the Preamble number 1 shown in FIG. 13.

As illustrated in FIG. 14, each Preamble part of terminals A and B is allocated to the frequency band of the interlace number 0 in each cluster, and uses different CS-ZC sequences associated with each of the Preamble number 0 and the Preamble number 1, as is the case with FIG. 9.

Further, as illustrated in FIG. 14, the Data part of terminal A is allocated to sub-PRB #0 of the interlace number 0, which is the same interlace number as that of the Preamble part, in the clusters with cluster numbers 0 and 5. Similarly, as illustrated in FIG. 14, the Data part of terminal B is allocated to sub-PRB #1 of the interlace number 0, which is the same interlace number as that of the Preamble part, in the clusters with cluster numbers 0 and 5.

As described above, the frequency resources where at least either one of the cluster number or the sub-PRB number is different are used for the transmission resources for each of the Data parts of terminals A and B. Thus, the Data parts of terminals A and B with different Preamble numbers are, for example, frequency-multiplexed in the frequency resources orthogonal in the interlaces with the same number, and can be demultiplexed in base station 200.

Further, Derivation Example 3 enables to allocate the Data part signals of different terminals 100 in units of sub-PRBs in the same interlace of the same cluster, as illustrated in FIG. 14. As described above, Derivation Example 3 makes it possible to increase the number of PRACHs allocatable in the same interlace by allocating the Data part signals in units of Sub-PRBs, thereby reducing the collision rate of random access.

Derivation Example 4

FIG. 15 illustrates an exemplary correspondence between transmission resources for the Preamble part and the Data part according to Derivation Example 4.

In FIG. 15, the transmission resources for the Preamble part are similar to those in Derivation Example 1 (see, for example, FIG. 8 or FIG. 9).

In Derivation Example 4, each of the plurality of clusters to which the Preamble part and the Data part are allocated is constituted of a plurality of subcarriers (also referred to as Comb or Tone, for example).

For example, the plurality of subcarriers are each numbered (e.g., with a subcarrier number, a Com number, or a Tone number) in units of resources in each of the plurality of clusters for the transmission resources for the Preamble part (i.e., in units of interlaces in a cluster). In FIG. 15, for example, each interlace in the clusters includes five subcarriers (Comb numbers 0 to 4).

As illustrated in FIG. 15, the transmission resources for the Data part are configured with the frequency resources in units of subcarriers in Derivation Example 4. The transmission resources for the Data part include, for example, subcarriers of the same Comb number in the plurality of clusters. The Comb numbers included in the transmission resources for the Data part are associated with the Preamble numbers (i.e., the code sequences) configured for the Preamble part.

In FIG. 15, for example, different Comb numbers 0 to 4 are respectively associated with the Preamble numbers 0 to 4. In other words, interlace allocation in units of subcarriers (referred to as, for example, a tone-interlace design or Interleaved Frequency Division Multiple Access (IFDMA)) is applied to the transmission resources for the Data part.

Figure 16:
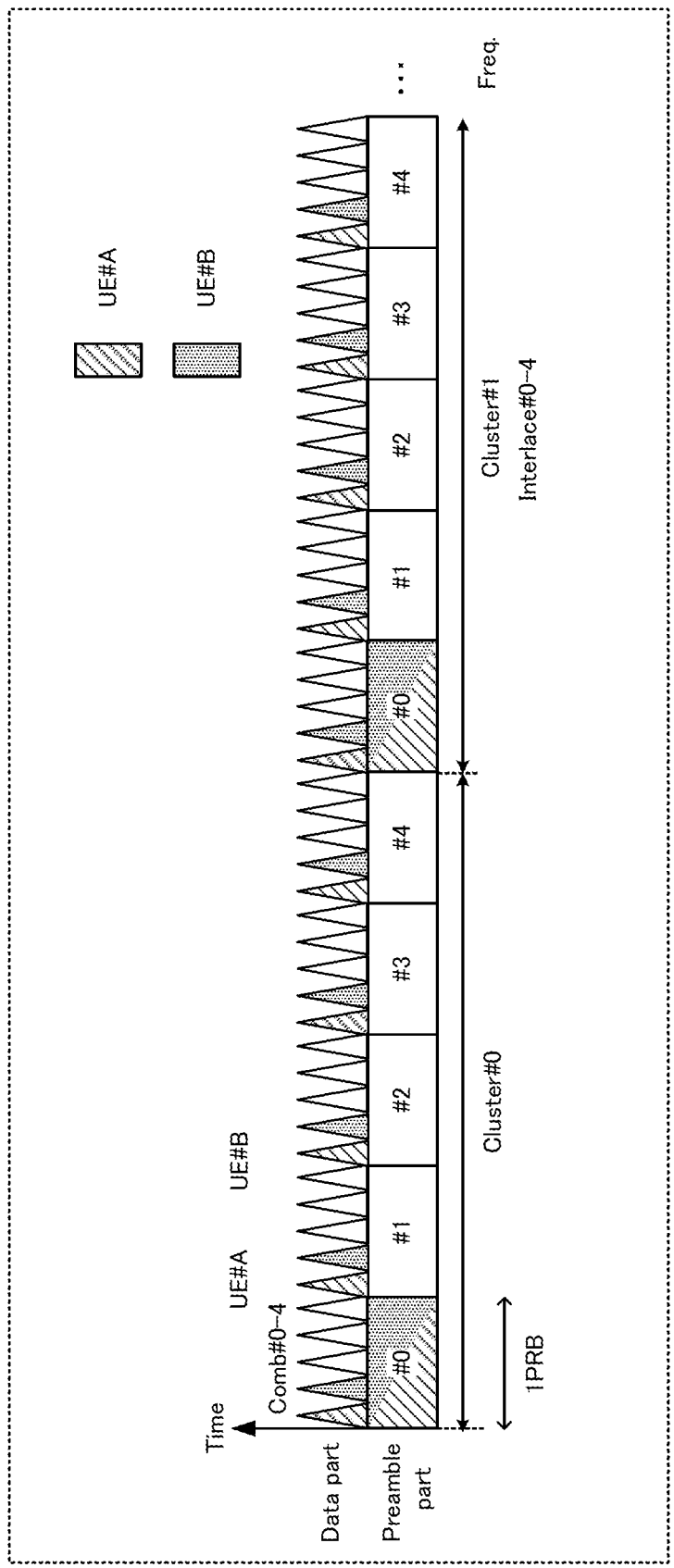
FIG. 16 illustrates an exemplary transmission resource allocation according to Derivation Example 4 of Embodiment 1.

FIG. 16 illustrates an exemplary configuration of the transmission resources for terminal 100 in Derivation Example 4.

In FIG. 16, the horizontal axis indicates a frequency domain (or frequency resource allocation), and the vertical axis indicates a time domain (e.g., time resource allocation). In addition, the configurations of the clusters and the interlaces in the clusters, in a symbol to which the Preamble part illustrated in FIG. 16 is allocated, are similar to those in Derivation Example 1 (e.g., FIG. 9).

In FIG. 16, however, each PRB includes five Combs #0 to #4 (subcarriers or subcarrier groups) in a symbol to which the Data part is allocated. Note that the number of Combs constituting the PRB is not limited to five, and may include other numbers.

In addition, FIG. 16 illustrates an example in which terminal A (UE #A) selects the Preamble number 0 shown in FIG. 15 and terminal B (UE #B) selects the Preamble number 1 shown in FIG. 15.

As illustrated in FIG. 16, each Preamble part of terminals A and B is allocated to the frequency band of the interlace number 0 in each cluster, and uses different CS-ZC sequences associated with each of the Preamble number 0 and the Preamble number 1, as is the case with FIG. 9.

Further, as illustrated in FIG. 16, the Data part of terminal A is allocated to the Comb (or the subcarrier) with the Comb number 0 in each of the interlaces #0 to #4 in each cluster. Similarly, as illustrated in FIG. 16, the Data part of terminal B is allocated to the Comb (or the subcarrier) with the Comb number 1 in each of the interlaces #0 to #4 in each cluster.

As described above, the Data parts of terminals A and B with different Preamble numbers are frequency-multiplexed in orthogonal frequency resources, and can be demultiplexed in base station 200.

Further, in Derivation Example 4, the Data part signals of each terminal 100 are respectively allocated to a plurality of interlaces in each cluster. In other words, the Data part signals of each terminal 100 are allocated to each of the clusters to which the Preamble part signals are allocated. Thus, the Data part signals of each terminal 100 are allocated over the entire band (clusters #0 to #9 in FIG. 16) similar to the band for the Preamble part signals.

Herein, there is an "OCB requirement", with regard to the signal transmission in unlicensed bands, that signals need to be transmitted in the 80-100% of a carrier sense band (or a band of an integral multiple of 20 MHz, which is also referred to as a sub-band), in the requirements defined by European Telecommunications Standards Institute (ETSI).

In Derivation Example 4, for example, both Preamble parts and Data parts are transmitted using each cluster of cluster numbers 0 to 9, as illustrated in FIG. 16, thereby meeting the OCB requirement of 80-100%.

Derivation Example 5

FIG. 17 illustrates an exemplary correspondence between transmission resources for the Preamble part and the Data part according to Derivation Example 5.

In FIG. 17, the transmission resources for the Preamble part are similar to those in Derivation Example 1 (see, for example, FIG. 8 or FIG. 9). In FIG. 17, however, ten Preamble numbers 0 to 9 are configured for terminal 100, as an example. Each Preamble number is associated with a different code sequence (e.g., a CS-ZC sequence) with each other. Terminal 100, for example, randomly selects a single Preamble number among the Preamble numbers 0 to 9.

Additionally, in Derivation Example 5, the transmission resources for the Data part are configured in the frequency domain with the interlace configured for the Preamble part (the interlace number 0 in FIG. 17) and some clusters among the clusters (or cluster numbers) configured for the Preamble part as illustrated in FIG. 17, as is the case with Derivation Example 1 (see, for example, FIG. 8 or FIG. 9).

Further, in Derivation Example 5, the transmission resources for the Data part are configured with at least one symbol among a plurality of symbols (two symbols in FIG. 17) in the time domain.

The at least one symbol configured for the transmission resources for the Data part is associated with a Preamble number (i.e., a code sequence) configured for the Preamble part. At this time, one of different symbol numbers (the symbol number 0 or 1) is associated with each of a plurality of Preamble numbers where the same cluster numbers are configured for the transmission resources for the Data part, as illustrated in FIG. 17. For example, in FIG. 17, the symbol number 0 and the symbol number 1 are respectively associated with the Preamble numbers 0 and 1 as a group. The same applies to other groups of Preamble numbers with which the same cluster numbers are associated. In other words, the resources where at least either one of the cluster number or the symbol number is different are associated with respective Preamble numbers illustrated in FIG. 17 as the transmission resources for the Data part.

Figure 18:
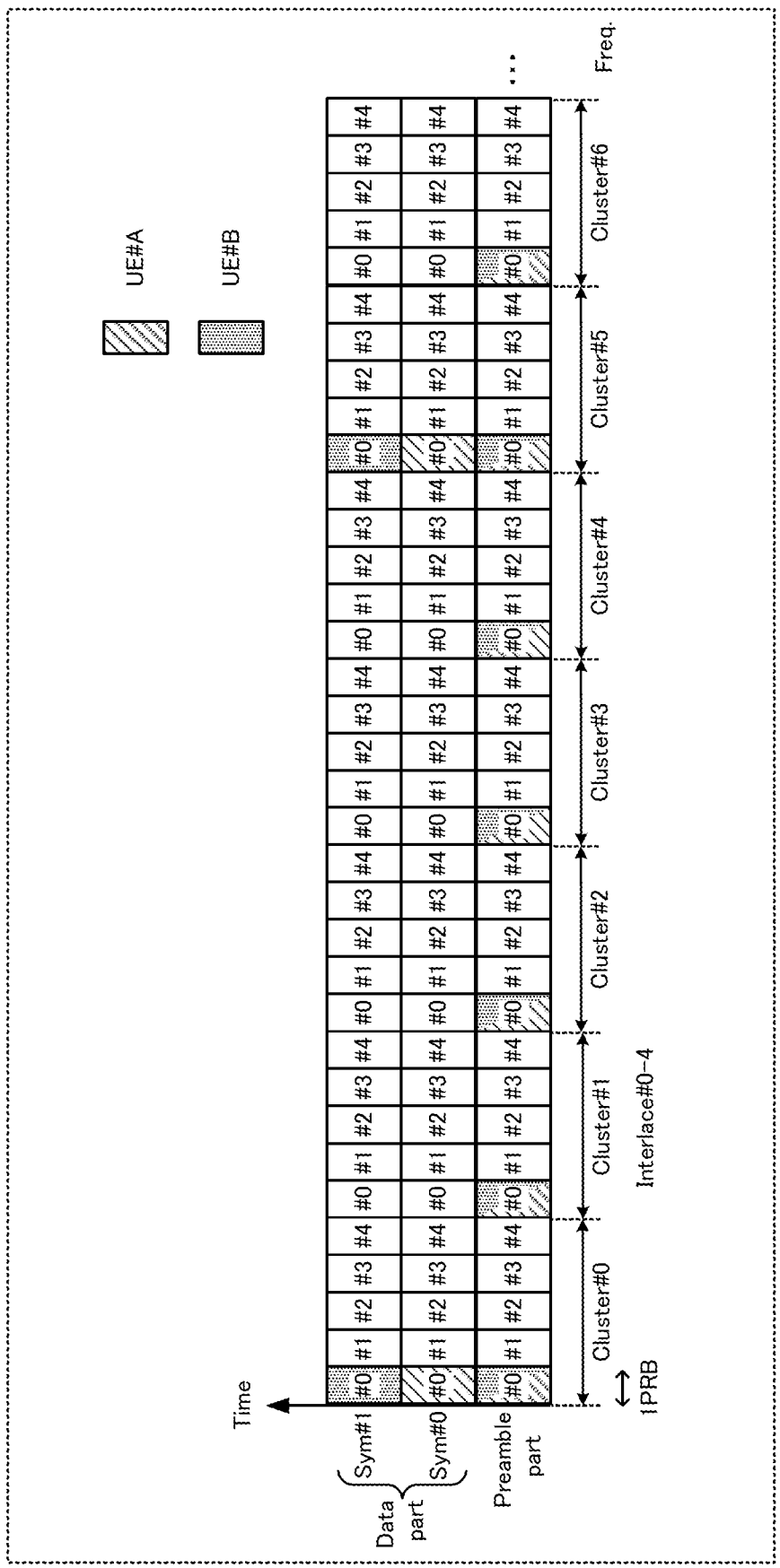
FIG. 18 illustrates an exemplary transmission resource allocation according to Derivation Example 5 of Embodiment 1.

FIG. 18 illustrates an exemplary configuration of the transmission resources for terminal 100 in Derivation Example 5.

In FIG. 18, the horizontal axis indicates a frequency domain (or frequency resource allocation), and the vertical axis indicates a time domain (e.g., time resource allocation). In addition, the configurations of the clusters and the interlaces in the clusters illustrated in FIG. 18 are similar to those in Derivation Example 1 (e.g., FIG. 9). In FIG. 18, however, a single symbol is configured for the Preamble part and a plurality of symbols (two symbols in FIG. 18) are configured for the Data part in the time domain.

In addition, FIG. 18 illustrates an example in which terminal A (UE #A) selects the Preamble number 0 shown in FIG. 17 and terminal B (UE #B) selects the Preamble number 1 shown in FIG. 17.

As illustrated in FIG. 18, each Preamble part of terminals A and B is allocated to the frequency band of the interlace number 0 in each cluster, and uses different CS-ZC sequences associated with each of the Preamble number 0 and the Preamble number 1, as is the case with FIG. 9.

Also, as illustrated in FIG. 18, the Data part of terminal A is allocated to the symbol with the symbol number 0 (Sym #0) of the interlace number 0, which is the same interlace number as that of the Preamble part, in the clusters with the cluster numbers 0 and 5. Similarly, as illustrated in FIG. 18, the Data part of terminal B is allocated to the symbol with the symbol number 1 (Sym #1) of the interlace number 0, which is the same interlace number as that of the Preamble part, in the clusters with the cluster numbers 0 and 5.

As described above, the resources where at least either one of the cluster number or the symbol number is different are used for the transmission resources for each of the Data parts of terminals A and B. Thus, the Data parts of terminals A and B with different Preamble numbers are, for example, time-multiplexed in symbols which are orthogonal time resources in the interlaces with the same number, and can be demultiplexed in base station 200.

Further, Derivation Example 5 makes it possible to increase the number of PRACH allocatable in the same interlace by increasing the time resources (e.g., the number of symbols) for transmitting the Data part signals, for example, as compared with Derivation Example 1, thereby reducing the collision rate of random access.

Derivation Example 6

FIG. 19 illustrates an exemplary correspondence between transmission resources for the Preamble part and the Data part according to Derivation Example 6.

In FIG. 19, the transmission resources for the Preamble part are similar to those in Derivation Example 1 (see, for example, FIG. 8 or FIG. 9). In FIG. 19, however, four Preamble numbers 0 to 3 are configured for terminal 100, as an example. Each Preamble number is associated with a different code sequence (e.g., a CS-ZC sequence) with each other. Terminal 100, for example, randomly selects a single Preamble number among the Preamble numbers 0 to 3.

In addition, the Preamble part and the Data part are frequency-multiplexed in different interlaces in the same symbol in Derivation Example 6.

For example, as illustrated in FIG. 19, the transmission resources for the Data part are configured with different interlaces (or interlace numbers) from the interlace configured for the Preamble part (the interlace number 0, in FIG. 19) in each of the clusters configured for the Preamble part. The interlaces configured for the transmission resources for the Data part are associated with the Preamble numbers (i.e., the code sequences) configured for the Preamble part. At this time, the Data parts of terminals 100 using different Preamble numbers are frequency-multiplexed in different interlaces in the same symbol.

Further, as illustrated in FIG. 19, the transmission resources for the Data part are configured with the same clusters (or cluster numbers) as the clusters configured for the Preamble part (the cluster numbers 0 to 9 in FIG. 19).

Figure 20:
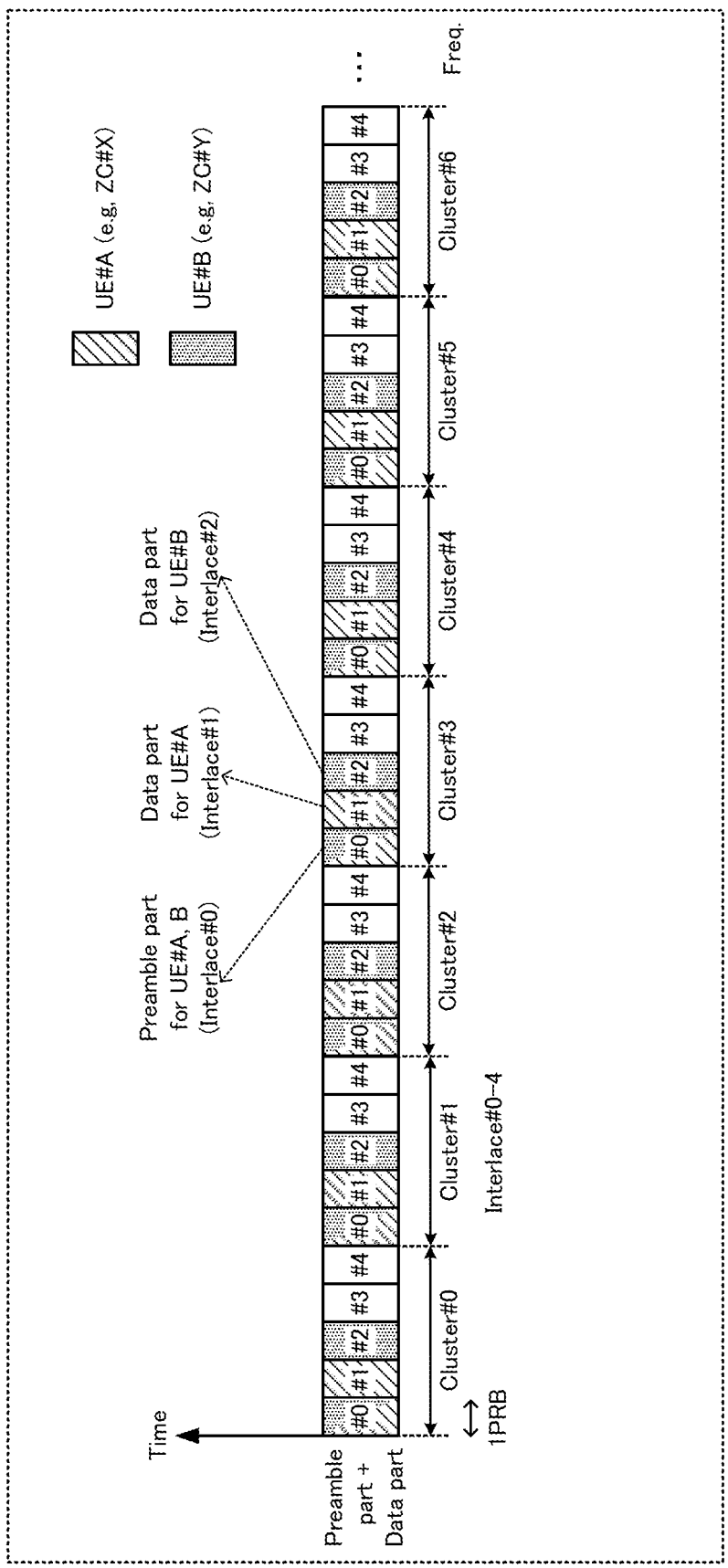
FIG. 20 illustrates an exemplary transmission resource allocation according to Derivation Example 6 of Embodiment 1.

FIG. 20 illustrates an exemplary configuration of the transmission resources for terminal 100 in Derivation Example 6.

In FIG. 20, the horizontal axis indicates a frequency domain (or frequency resource allocation), and the vertical axis indicates a time domain (e.g., time resource allocation). In addition, the configurations of the clusters and the interlaces in the clusters illustrated in FIG. 20 are similar to those in Derivation Example 1 (e.g., FIG. 9). In FIG. 20, however, one symbol is configured for both the Preamble part and the Data part in the time domain.

In addition, FIG. 20 illustrates an example in which terminal A (UE #A) selects the Preamble number 0 shown in FIG. 19 and terminal B (UE #B) selects the Preamble number 1 shown in FIG. 19.

As illustrated in FIG. 20, each Preamble part of terminals A and B is allocated to the frequency band of the interlace number 0 in each cluster, and uses different CS-ZC sequences associated with each of the Preamble number 0 and the Preamble number 1, as is the case with FIG. 9.

Further, as illustrated in FIG. 20, the Data part of terminal A is allocated to the frequency band of the interlace number 1 in each cluster. Meanwhile, as illustrated in FIG. 20, the Data part of terminal B is allocated to the frequency band of the interlace number 2 in each cluster.

As described above, each Preamble part of terminals A and B and each Data part of terminals A and B with different Preamble numbers are frequency-multiplexed in orthogonal frequency resources, and can be demultiplexed in base station 200. In other words, a plurality of terminals 100 can transmit the Preamble part and the Data part using the same symbol.

Thus, Derivation Example 6 enables to reduce the delay time for random access by frequency-multiplexing the Preamble part and the Data part.

Further, in Derivation Example 6, both the Preamble part and the Data part are transmitted, for example, using each cluster of cluster numbers 0 to 9, as illustrated in FIG. 20, thereby meeting the OCB requirement of 80-100%, as is the case with Derivation Example 4.

Derivation Example 7

FIG. 21 illustrates an exemplary correspondence between transmission resources for the Preamble part and the Data part according to Derivation Example 7.

In FIG. 21, the transmission resources for the Preamble part are similar to those in Derivation Example 1 (see, for example, FIG. 8 or FIG. 9). In FIG. 21, however, four Preamble numbers 0 to 3 are configured for terminal 100, as an example. Each Preamble number is associated with a different code sequence (e.g., a CS-ZC sequence) with each other. Terminal 100, for example, randomly selects a single Preamble number among the Preamble numbers 0 to 3.

In addition, the transmission resources for the Data part are allocated in some of the plurality of clusters configured for the transmission resources for the Preamble in Derivation Example 7, as is the case with Derivation Example 1. For example, as illustrated in FIG. 21, each Preamble number is associated with the clusters with different cluster numbers from each other for the transmission resources for the Data part.

Further, in Derivation Example 7, the number of clusters associated with the Preamble numbers for the transmission resources for the Data part is different for each Preamble (i.e., for each code sequence used for the Preamble part signals), as illustrated in FIG. 21. For example, as illustrated in FIG. 21, three clusters (or cluster numbers) are each associated with the Preamble numbers 0 and 1, while two clusters (or cluster numbers) are each associated with the Preamble numbers 2 and 3.

The Preamble numbers selectable by terminal 100 may be configured, for example, according to the reception quality of terminal 100. The reception quality of terminal 100 may be measured by, for example, a path loss level or a received signal level (e.g., Received Signal Reception Power (RSRP)) between terminal 100 (UE) and base station 200 (gNB), or other parameters.

In FIG. 21, the Preamble numbers 0 and 1 may be selectable by terminal 100 when the path loss level is greater than the threshold X, for example, and the Preamble numbers 2 and 3 may be selectable when the path loss level is less than or equal to the threshold X. Note that FIG. 21 is an example, and the number of clusters associated with the Preamble number for the transmission resources for the Data part is not limited to two and three. The variety of the number of clusters associated with the Preamble number is also not limited to two, and may be three or more variations.

Figure 22:
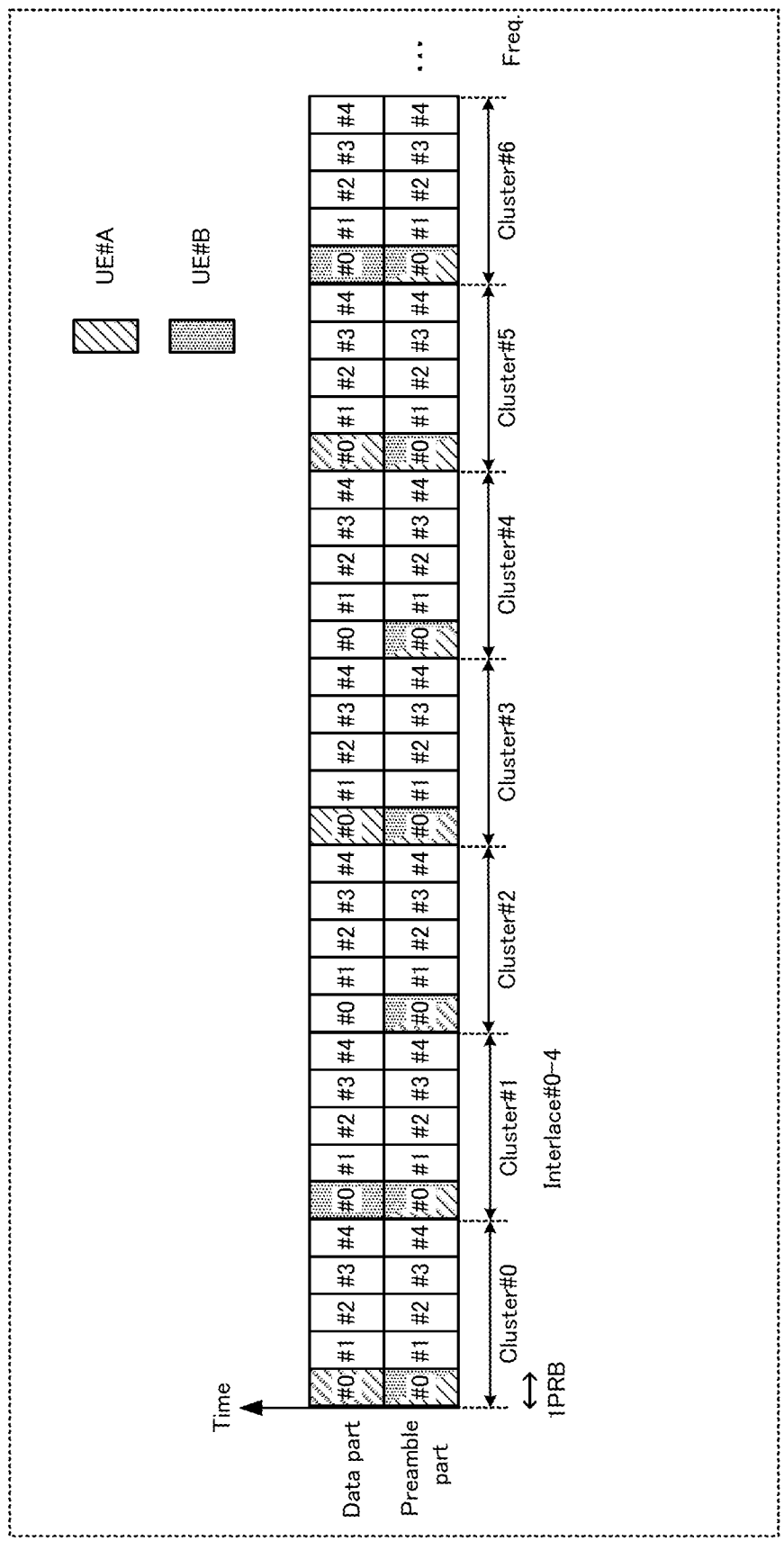
FIG. 22 illustrates an exemplary transmission resource allocation according to Derivation Example 7 of Embodiment 1.

FIG. 22 illustrates an exemplary configuration of the transmission resources for terminal 100 in Derivation Example 7.

In FIG. 22, the horizontal axis indicates a frequency domain (or frequency resource allocation), and the vertical axis indicates a time domain (e.g., time resource allocation). In addition, the configurations of the clusters and interlaces in the clusters illustrated in FIG. 22 are similar to those in FIG. 9.

Further, FIG. 22 illustrates an example in which terminal A (UE #A) has a path loss level greater than the threshold X and randomly selects the Preamble number 0 illustrated in FIG. 21, while terminal B (UE #B) has a path loss level less than or equal to the threshold X and randomly selects the Preamble number 2 illustrated in FIG. 21.

As illustrated in FIG. 22, each Preamble part of terminals A and B is allocated to the frequency band of the interlace number 0 in each cluster, and uses different CS-ZC sequences associated with each of the Preamble number 0 and the Preamble number 1, as is the case with FIG. 9.

In addition, as illustrated in FIG. 22, the Data part of terminal A is allocated to sub-PRB #0 of the interlace number 0, which is the same as the Preamble part, in three clusters with the cluster numbers 0, 3, and 5. Meanwhile, as illustrated in FIG. 22, the Data part of terminal B is allocated to sub-PRB #1 of the interlace number 0, which is the same as the Preamble part, in two clusters with the cluster numbers 2, and 7.

As described above, the Data parts of terminals A and B with different Preamble numbers are frequency-multiplexed in orthogonal frequency resources, and can be demultiplexed in base station 200.

The amount of data to be transmitted in the Data part is constant, for example. In this regard, the code rate for the Data part is lowered and the performance is improved, as the number of clusters for the Data part transmission increases. Thus, as illustrated in FIG. 22, terminal A whose path loss level is greater than the threshold X can improve the performance of the Data part by transmitting the Data part using many clusters compared to terminal B whose path loss level is less than or equal to the threshold X, for example.

Therefore, according to Derivation Example 7, the performance of the Data part can be improved by appropriately changing the amount of the frequency resources or the code rate for transmitting the Data part signals in accordance with the reception quality (e.g., the path loss level) of terminal 100.

Derivation examples 1 to 7 of the transmission resources for the Data part have been described thus far.

Note that at least two of the above-described Derivation Examples 1 to 7 may be combined. The combination of Derivation Example 2 and Derivation Example 3, for example, makes it possible to increase the number of PRACH allocatable in the same interlace as well as to obtain the frequency diversity effect for the Data part, thereby reducing the collision rate of random access.

Alternatively, terminal 100 and base station 200 may switch between at least two derivation examples among Derivation Examples 1 to 7 depending on, for example, the configuration of terminal 100 (or the status of terminal 100).

As described above, the resources to be used for the transmission of the Data part are determined based on the resources to be used for the transmission of the Preamble part, in the present embodiment. For example, the Preamble numbers selectable by terminal 100 are associated with the transmission resources for the Data part (e.g., a cluster number, an interlace number, a sub-PRB number, a Comb number, or a symbol number), in addition to the transmission resources for the Preamble part (e.g., a cluster number and an interlace number).

This allows terminal 100 and base station 200 to identify the transmission resources for both the Preamble part and the Data part according to the configured Preamble number. Further, the Preamble parts to be transmitted from a plurality of terminals 100 are code-multiplexed, and the Data parts to be transmitted from the plurality of terminals 100 are frequency-multiplexed or time-multiplexed.

According to the present embodiment, it is thus possible to appropriately perform random access processing.

Each embodiment of the present disclosure has been described, thus far.

OTHER EMBODIMENTS (1) The operations in unlicensed bands have been described in the above embodiments. The present disclosure is, however, not limited to be applied to the unlicensed bands. The present disclosure can also be applied to the licensed bands, and the same effects can be obtained. For example, the present disclosure can be applied, in the licensed bands, to Grant free transmission or transmission of URLLC services where transmission resources are determined in advance, and the present disclosure brings the effects of reducing a delay time or improving the performance.

(2) In the above embodiments, the correspondences between the Preamble numbers and the transmission resources for the Preamble part and the Data part are specified by tables, for example, illustrated in FIG. 8, FIG. 10, FIG. 11, FIG. 13, FIG. 15, FIG. 17, FIG. 19, and FIG. 21. The correspondences are, however, not limited thereto, and may be specified by equations, for example.

As an example, the following equations show the cluster numbers (represented as C0, C1, and C2) for respective symbols (symbol numbers) among the transmission resources for the Data part for Derivation Example 2 (see, for example, FIG. 11):

$$C0 = P, P + N/2$$

$$C1 = P + 2, \mod(P + 2 + N/2, N), \text{ and}$$

$$C2 = P + 4, \mod(P + 4 + N/2, N),$$

wherein:

C0: Cluster number used for symbol number 0 of the Data part (any of 0 to N−1);
C1: Cluster number used for symbol number 1 of the Data part (any of 0 to N−1);
C2: Cluster number used for symbol number 2 of the Data part (any of 0 to N−1);
P: Preamble number (e.g., 0 to 4 in FIG. 11); and
N: Number of clusters (e.g., N=10 in FIG. 11).

(3) Other resources (e.g., free resources) different from the transmission resources for PRACH (e.g., the Preamble part and the Data part) described in the above embodiments may be configured for other RACH resources (RACH occasions), for example, and may also be used for scheduling other uplink channels (e.g., PUSCH, PUCCH and SRS).

(4) PRACH has been described as an example of transmission signals in the above embodiments. The transmission signals are, however, not limited to PRACH, and may be, for example, other signals to be transmitted from terminal 100 (corresponding to a transmission apparatus) to base station 200 (corresponding to a reception apparatus), or transmission signals to be transmitted from base station 200 (corresponding to the transmission apparatus) to terminal 100 (corresponding to the reception apparatus).

(5) Interlaces may be represented, for example, by the number of interlaces in a certain band (e.g., expressed as M, corresponding to the number of interlaces in a cluster) and the number of PRBs that constitute each interlace (e.g., expressed as N, corresponding to the number of clusters). Further, the interlaces are not limited to be dispersedly allocated in units of PRBs in the frequency domain, and may be dispersedly allocated in units of subcarrier groups each constituted of a less number of subcarriers than those constituting 1 PRB, for example. Additionally, the frequency intervals of the resources in which interlaces are respectively allocated are not limited to equal intervals.

(6) The number of clusters, the number of interlaces in each cluster, and the number of subcarriers per interlace (or PRB) in a specific frequency band (e.g., system band) exemplified in the above embodiment are not limited thereto, and may include other values.

(7) In the above embodiments, the Block based interlace design may also be referred to as a "PRB-based interlace design". In addition, the interlace may also be referred to as a "cluster". Further, the cluster may also be referred to as a "Cluster Block". For example, it may be expressed that a cluster block includes a plurality of clusters.

Other embodiments have been described, thus far.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples."

A transmission apparatus according to an embodiment of the present disclosure includes: transmission circuitry, which, in operation, transmits a data signal; and control circuitry, which, in operation, determines, based on a first resource used for transmission of a preamble signal, a second resource used for transmission of the data signal.

In the transmission apparatus according to an embodiment of the present disclosure, the first resource is dispersedly allocated in each of a plurality of bands, and the second resource is allocated in a part of bands of the plurality of bands.

In the transmission apparatus according to an embodiment of the present disclosure, the part of bands is associated with a code sequence configured for the preamble signal.

In the transmission apparatus according to an embodiment of the present disclosure, the part of bands is different for each of a plurality of symbols where the second resource is allocated.

In the transmission apparatus according to an embodiment of the present disclosure, each resource of the plurality of bands for the first resource includes a plurality of resource units, the second resource includes at least one resource unit among the plurality of resource units included in the part of bands, and the at least one resource unit is associated with a code sequence configured for the preamble signal.

In the transmission apparatus according to an embodiment of the present disclosure, the second resource includes at least one symbol among a plurality of symbols, and the at least one symbol is associated with a code sequence configured for the preamble signal.

In the transmission apparatus according to an embodiment of the present disclosure, a number of bands included in the part of bands is different for each code sequence configured for the preamble signal.

In the transmission apparatus according to an embodiment of the present disclosure, each of the plurality of bands is constituted of a plurality of subcarriers, the plurality of subcarriers are each numbered in units of resources in each of the plurality of bands for the first resource, the second resource includes the subcarriers with same numbers in the plurality of bands, and numbers for the subcarriers included in the second resources are each associated with a code sequence configured for the preamble signal.

In the transmission apparatus according to an embodiment of the present disclosure, the data signal and the preamble signal are frequency-multiplexed, the first resource is dispersedly allocated in each of a plurality of bands, the second resource includes a resource different from the first resource in each of the plurality of bands, and the second resource is associated with a code sequence configured for the preamble signal.

A reception apparatus according to an embodiment of the present disclosure includes: reception circuitry, which, in operation, receives a data signal; and control circuitry, which, in operation, determines a resource used for transmission of the data signal based on a resource used for transmission of a preamble signal.

A transmission method according to an embodiment of the present disclosure includes: determining a resource used for transmission of a data signal based on a resource used for transmission of a preamble signal; and transmitting the data signal.

A reception method according to an embodiment of the present disclosure includes: determining a resource used for transmission of a data signal based on a resource used for transmission of a preamble signal; and receiving the data signal.

The disclosure of Japanese Patent Application No. 2018-206734, filed Nov. 1, 2018 including the specification, drawings, and abstract, is incorporated herein by reference in its entirety.

INDUSTRIAL APPLICABILITY

One embodiment of the present disclosure is useful in mobile communication systems.

REFERENCE SIGNS LIST

100 Terminal
101, 203 Controller
102, 204 Preamble resource configurator
103, 205 Data resource configurator
104 Preamble generator
105 Preamble resource allocator
106 Data generator
107 Data resource allocator
108, 211 Radio transmitter
109, 201 Antenna
110, 202 Radio receiver 111, 207 Demodulator/decoder
200 Base station
206 Preamble detector
208 Scheduler
209 Data generator
210 Encoder/modulator

The invention claimed is:

1. A communication apparatus, comprising:
circuitry, which, in operation:
in response to a path loss between the communication apparatus and a base station being less than a threshold, selects a random access preamble randomly from a first plurality of random access preambles; and,
in response to the path loss not being less than the threshold, selects a random access preamble randomly from a second plurality of random access preambles, wherein, data transmission resource information is configured, which includes a subcarrier number and a number of consecutive interlaces for the first plurality of random access preambles and the second plurality of random access preambles, the subcarrier number specifying one index out of five indices indicating five interlace positions evenly dispersed in physical resource block (PRB) clusters in a frequency domain, and the number of consecutive interlaces indicating a number of consecutive PRBs in each of the PRB clusters; and
a transmitter, which, in operation, transmits the selected random access preamble and a data signal based on the data transmission resource information corresponding to the selected random access preamble.

2. The communication apparatus according to claim 1, wherein the first plurality of random access preambles and the second plurality of random access preambles are generated according to different sequences, respectively.

3. The communication apparatus according to claim 1, wherein the data transmission resource information includes a symbol number that indicates a symbol to which the data signal is mapped.

4. The communication apparatus according to claim 1, wherein the transmitter transmits the selected random access preamble in a 2-step random access procedure.

5. A communication method for a communication apparatus, the communication method comprising:
in response to a path loss between the communication apparatus and a base station being less than a threshold, selecting a random access preamble randomly from a first plurality of random access preambles;
in response to the path loss not being less than the threshold, selecting a random access preamble randomly from a second plurality of random access preambles, wherein, data transmission resource information is configured, which includes a subcarrier number and a number of consecutive interlaces for the first plurality of random access preambles and the second plurality of random access preambles, the subcarrier number specifying one index out of five indices indicating five interlace positions evenly dispersed in physical resource block (PRB) clusters in a frequency domain, and the number of consecutive interlaces indicating a number of consecutive PRBs in each of the PRB clusters; and
transmitting the selected random access preamble and a data signal based on the data transmission resource information corresponding to the selected random access preamble.

6. The communication method according to claim 5, wherein the first plurality of random access preambles and the second plurality of random access preambles are generated according to different sequences, respectively.

7. The communication method according to claim 5, wherein the data transmission resource information includes a symbol number that indicates a symbol to which the data signal is mapped.

8. The communication method according to claim 5, the selected random access preamble is transmitted in a 2-step random access procedure.

* * * * *